United States Patent
Steeves

(10) Patent No.: US 7,271,727 B2
(45) Date of Patent: *Sep. 18, 2007

(54) DUAL FREQUENCY RADIO TAG FOR A RADIO FREQUENCY IDENTIFICATION SYSTEM

(75) Inventor: Wayne E. Steeves, Plano, TX (US)

(73) Assignee: Axcess International, Inc., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/270,286

(22) Filed: Nov. 9, 2005

(65) Prior Publication Data

US 2006/0071756 A1  Apr. 6, 2006

Related U.S. Application Data

(63) Continuation of application No. 09/357,435, filed on Jul. 20, 1999, now Pat. No. 7,005,985.

(51) Int. Cl.
G08B 13/14 (2006.01)
(52) U.S. Cl. ............ 340/572.7; 340/10.1; 455/41.1; 455/41.2; 455/73
(58) Field of Classification Search ............... None
See application file for complete search history.

(56) References Cited

U.S. PATENT DOCUMENTS

| | | | | |
|---|---|---|---|---|
| 3,868,640 A | 2/1975 | Binnie et al. | ............... | 340/151 |
| 4,303,910 A | 12/1981 | McCann | ............... | 340/572 |
| 4,471,345 A | 9/1984 | Barrett, Jr. | ............... | 340/572 |
| 4,528,663 A | 7/1985 | Citta | ............... | 370/94 |
| 4,656,463 A | 4/1987 | Anders et al. | ............... | 340/573.4 |
| 4,672,374 A * | 6/1987 | Desjardins | ............... | 340/3.21 |
| 4,675,656 A | 6/1987 | Narcisse | ............... | 340/539.21 |
| 4,691,202 A | 9/1987 | Denne et al. | ............... | 340/825.54 |
| 4,862,160 A | 8/1989 | Ekchian et al. | ............... | 340/825.54 |
| 4,955,038 A | 9/1990 | Lee et al. | ............... | 375/35 |

(Continued)

FOREIGN PATENT DOCUMENTS

EP   0 161 779 A1   11/1985

(Continued)

OTHER PUBLICATIONS

Unknown, "Radio Frequency Identification (RFID)—Standards, Common Applications, A Look Ahead, and Recommended Reading," http://www.aimglobal.org/techinfo/rfid/rfidinto.html, 4 pgs; last updated Jul. 13, 1998, printed on Jun. 7, 1999.

(Continued)

Primary Examiner—Benjamin C. Lee
(74) Attorney, Agent, or Firm—Baker Botts L.L.P.

(57) ABSTRACT

A dual frequency radio tag for a radio frequency identification system is provided that includes an antenna system and a first receiver coupled to the antenna system. The first receiver receives and processes request signals from a first unit type at a first frequency. A second receiver is coupled to the antenna system and receives and processes request signals from a second unit type at a disparate second frequency. A transmitter is coupled to the antenna system and transmits response signals from the radio tag at the second frequency.

35 Claims, 9 Drawing Sheets

U.S. PATENT DOCUMENTS

| | | | | |
|---|---|---|---|---|
| 5,030,807 | A | * | 7/1991 | Landt et al. ................. 235/375 |
| 5,153,878 | A | | 10/1992 | Krebs ......................... 370/95.1 |
| 5,175,729 | A | | 12/1992 | Borras et al. ................. 370/79 |
| 5,220,557 | A | | 6/1993 | Kelley .......................... 370/50 |
| 5,227,803 | A | | 7/1993 | O'Connor et al. .......... 342/442 |
| 5,266,925 | A | | 11/1993 | Vercellotti et al. ........... 340/572 |
| 5,272,476 | A | | 12/1993 | McArthur et al. ..... 340/870.13 |
| 5,305,008 | A | | 4/1994 | Turner et al. ................. 342/44 |
| 5,351,052 | A | | 9/1994 | D'Hont et al. ................ 342/42 |
| 5,416,468 | A | | 5/1995 | Baumann .................... 340/573 |
| 5,425,032 | A | | 6/1995 | Shloss et al. .............. 370/95.2 |
| 5,448,242 | A | | 9/1995 | Sharpe et al. ................. 342/42 |
| 5,450,087 | A | | 9/1995 | Hurta et al. .................. 342/42 |
| 5,450,492 | A | | 9/1995 | Hook et al. .................... 380/28 |
| 5,453,747 | A | | 9/1995 | D'Hont et al. ................ 342/42 |
| 5,455,575 | A | * | 10/1995 | Schuermann ................ 342/42 |
| 5,471,212 | A | | 11/1995 | Sharpe et al. ................. 342/51 |
| 5,488,376 | A | | 1/1996 | Hurta et al. .................. 342/42 |
| 5,519,381 | A | * | 5/1996 | Marsh et al. .............. 340/10.2 |
| 5,525,992 | A | | 6/1996 | Froschermeier ............. 342/42 |
| 5,525,994 | A | | 6/1996 | Hurta et al. .................. 342/51 |
| 5,528,232 | A | | 6/1996 | Verma et al. .......... 340/825.49 |
| 5,539,394 | A | | 7/1996 | Cato et al. ............. 340/528.54 |
| 5,565,858 | A | | 10/1996 | Guthrie .................... 340/10.33 |
| 5,621,412 | A | | 4/1997 | Sharpe et al. ................. 342/51 |
| 5,633,875 | A | | 5/1997 | Hershey et al. ............. 370/346 |
| 5,640,151 | A | | 6/1997 | Reis et al. ............. 340/825.54 |
| 5,668,803 | A | | 9/1997 | Tymes et al. ................. 370/312 |
| 5,684,828 | A | | 11/1997 | Bolan et al. ................. 375/238 |
| 5,686,902 | A | | 11/1997 | Reis et al. ............. 340/825.54 |
| 5,721,733 | A | | 2/1998 | Wang et al. ................. 370/332 |
| 5,729,695 | A | | 3/1998 | Ahlm et al. ................. 395/220 |
| 5,737,330 | A | | 4/1998 | Fulthorp et al. ............ 370/346 |
| 5,742,237 | A | | 4/1998 | Bledsoe ................. 340/825.49 |
| 5,745,037 | A | | 4/1998 | Guthrie et al. ............. 340/573 |
| 5,804,810 | A | | 9/1998 | Woolley et al. ............. 235/492 |
| 5,822,714 | A | | 10/1998 | Cato ......................... 702/108 |
| 5,841,365 | A | | 11/1998 | Rimkus ..................... 340/5.61 |
| 5,857,152 | A | | 1/1999 | Everett ....................... 455/406 |
| 5,870,029 | A | | 2/1999 | Otto et al. ............. 340/825.36 |
| 5,874,902 | A | | 2/1999 | Heinrich et al. ....... 340/825.54 |
| 5,886,634 | A | | 3/1999 | Muhme ................... 340/572.1 |
| 5,929,778 | A | * | 7/1999 | Asama et al. ............ 340/10.51 |
| 5,942,987 | A | | 8/1999 | Heinrich et al. ....... 340/825.54 |
| 5,973,613 | A | | 10/1999 | Reis et al. .................. 340/7.23 |
| 6,034,603 | A | | 3/2000 | Steeves ..................... 340/10.2 |
| 6,127,928 | A | * | 10/2000 | Issacman et al. ........ 340/572.1 |
| 6,232,877 | B1 | | 5/2001 | Ashwin .................... 340/572.1 |
| 6,294,953 | B1 | | 9/2001 | Steeves ...................... 329/341 |
| 6,462,660 | B1 | | 10/2002 | Cannon et al. .......... 340/572.1 |
| 7,005,985 | B1 | * | 2/2006 | Steeves ................... 340/572.1 |

FOREIGN PATENT DOCUMENTS

| | | |
|---|---|---|
| EP | 0 245 555 A1 | 11/1987 |
| EP | 0 467 036 A2 | 1/1992 |
| EP | 0 565 046 A2 | 10/1993 |
| WO | WO91/17515 | 11/1991 |
| WO | WO93/04537 | 3/1993 |
| WO | WO95/22138 | 2/1995 |

OTHER PUBLICATIONS

AIM International, Inc., "Radio Frequency Identification RFID—A Glossary: AIM International WP-98/001R," http://www.aimglobal.org/techinfo/rfid/aimrfidglossary.html, document version: 1.1, Jun. 15, 1998, printed on Jun. 7, 1999.

International Preliminary Examination Report in PCT International Application No. PCT/US00/19126, dated Mar. 25, 2002.

International Search Report in PCT International Application No. PCT/US00/19126, dated Nov. 15, 2001, 6 pages.

International Search Report in PCT International Application No. PCT/US/19126, dated Feb. 11, 2000, 8 pages.

Wayne E. Steeves, "Low Power Receiver for Radio Tag and Method", U.S. Appl. No. 09/298,559, Filed: Apr. 22, 1999.

Wayne E, Steeves, "Distributed Tag Reader System and Method", U.S. Appl. No. 09/298,982, Inventor: Wayne E. Steeves, Filed: Apr. 22, 1999.

Wayne E. Steeves, Radio Frequency Identification System and Method, U.S. Appl. No. 09/357,435, filed Jul. 20, 1999.

Wayne E. Steeves, Method and System for Networking Radio Tags in a Radio Frequency Identification System, filed Nov. 9, 2005, U.S. Appl. No. 11/270,696, Jul. 20, 1999.

Wayne E. Steeves, Dual Frequency Radio Tag for Radio Frequency Identification System, Nov. 9, 2005, U.S. Appl. No. 11/270,286, Jul. 20, 1999.

* cited by examiner

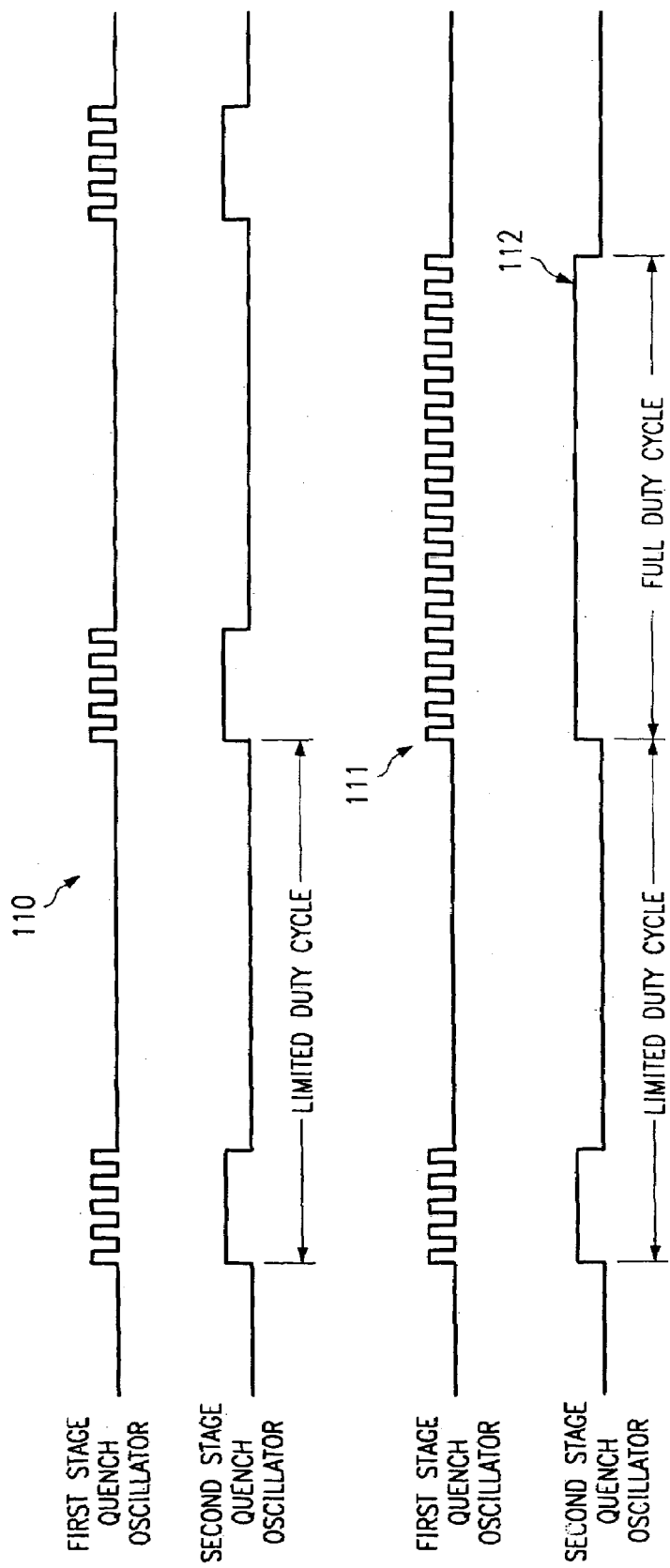

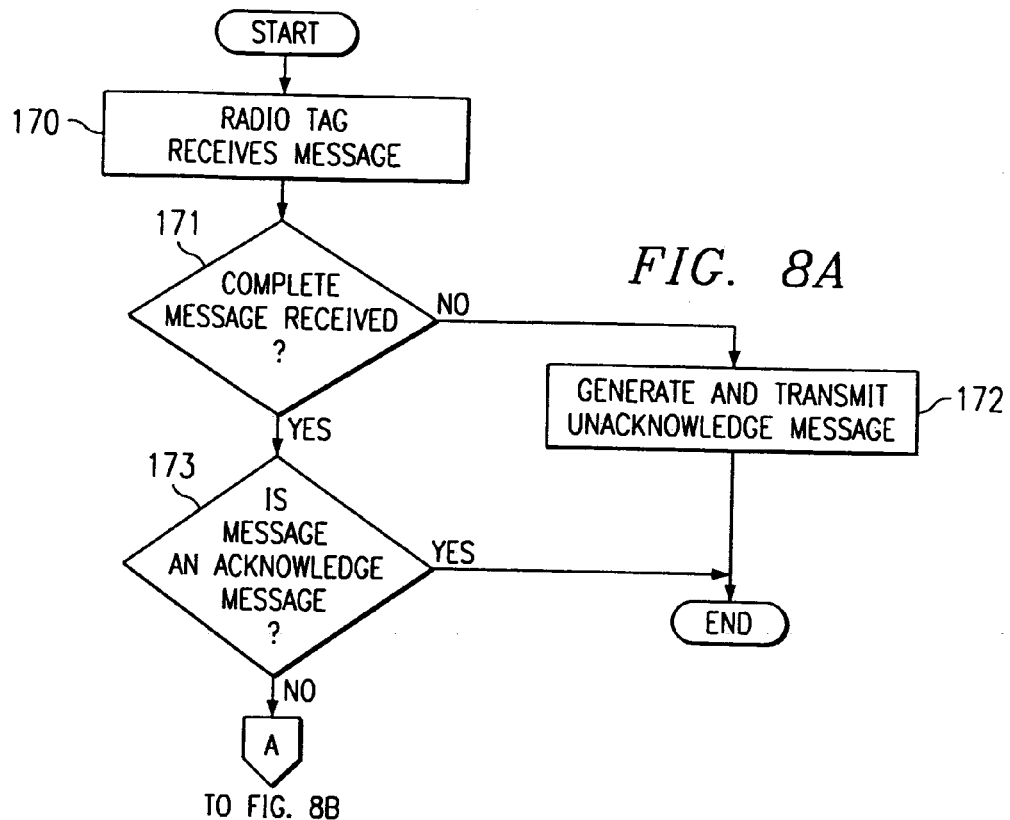
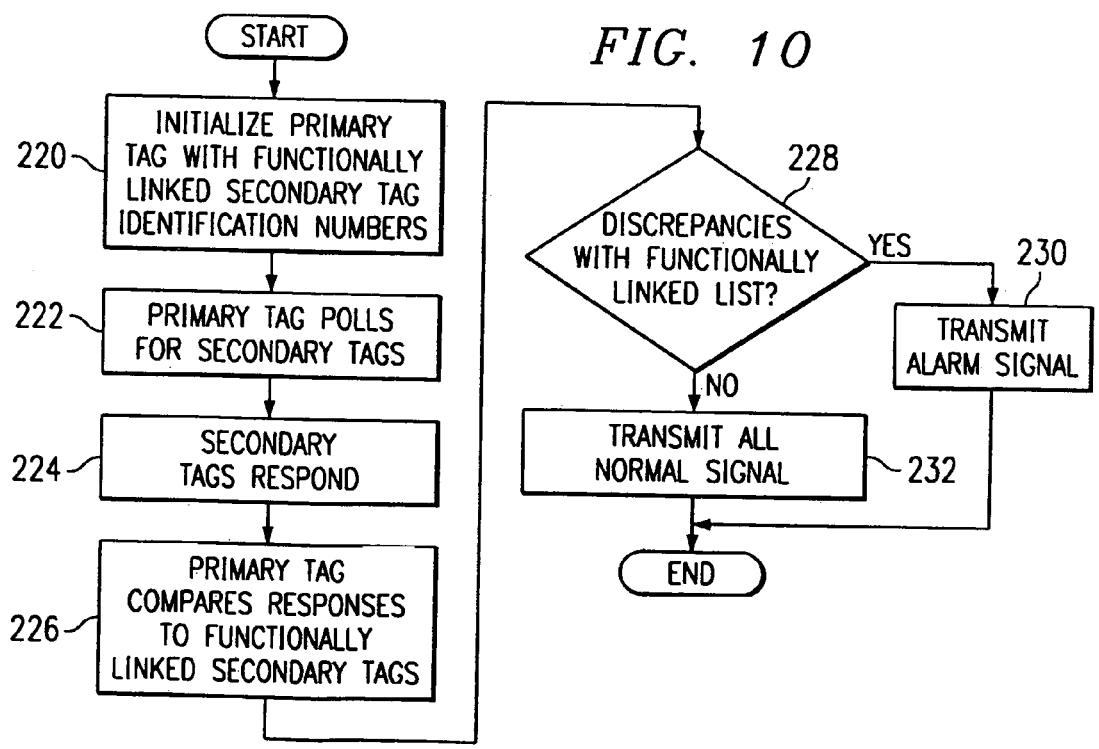

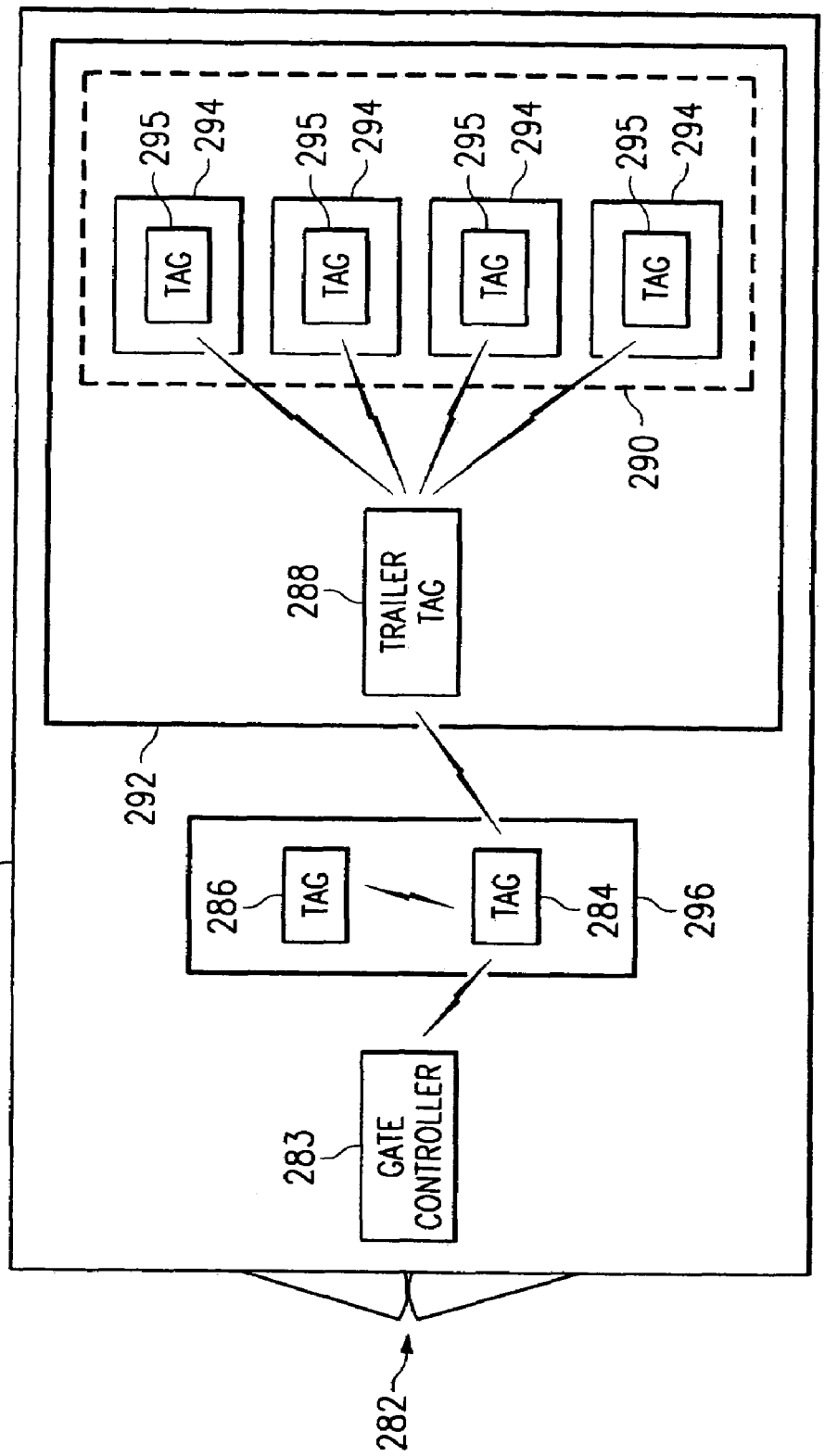

DUAL FREQUENCY RADIO TAG FOR A RADIO FREQUENCY IDENTIFICATION SYSTEM

CROSS REFERENCE TO RELATED APPLICATIONS

This application is a continuation of U.S. application Ser. No. 09/357,435, filed Jul. 20, 1999, now U.S. Pat. No. 7,005,985 by Wayne E. Steeves entitled "Radio Frequency Identification System and Method".

This application is related to U.S. application Ser. No. 11/270,696, filed Nov. 9, 2005, by Wayne E. Steeves entitled "Method and System for Networking Radio Tags in a Radio Frequency Identification System".

TECHNICAL FIELD OF THE INVENTION

This invention relates generally to asset tracking and control and more particularly to a dual frequency radio tag for a radio frequency identification system.

BACKGROUND OF THE INVENTION

The management and tracking of personnel, assets, and other objects is required in a wide variety of environments and is often cumbersome, labor intensive, and expensive. Radio receivers and transmitters have been used for many years to identify personnel and objects in such environments. For example, many systems are known for attaching radio tags to items, such as automobiles, so that when automobiles equipped with radio tags enter a certain area, such as a toll booth area, the automobiles are automatically identified and the appropriate tolls are deducted from corresponding accounts, thereby obviating the need for drivers to stop and make payment at toll booths. Innumerable other applications for such radio tag systems have been identified, in areas ranging from inventory control to facility security to sporting event timing.

Radio frequency identification (RFID) systems generally use a fixed position base station capable of reading portable tags attached to personnel, assets, or other objects. Typical base stations include an antenna, a reader, and a computer. If an RFID system covers a large enough area, multiple base stations may be necessary to provide adequate coverage for the large area.

In addition, bandwidth use is high because the base station computer communicates with and processes information from every radio tag within its operational range. The lack of available bandwidth limits multi-read capabilities of the system which allows a base station to interact with more than one radio tag at any particular time.

SUMMARY OF THE INVENTION

In accordance with the present invention, an improved dual frequency radio tag for a radio frequency identification system is provided which substantially eliminates or reduces disadvantages and problems associated with previous radio frequency identification systems.

According to one embodiment of the present invention, there is provided a dual frequency radio tag for a radio frequency identification system comprising an antenna system and a first receiver coupled to the antenna system. The first receiver receives and processes request signals from a first unit type at a first frequency. A second receiver is coupled to the antenna system and receives and processes request signals from a second unit type at a disparate second frequency. A transmitter is coupled to the antenna system and transmits response signals at the second frequency.

More specifically, in accordance with one embodiment of the present invention, the first unit type is a base station and the second unit type is another tag. In this and other embodiments, a processor is further coupled to the first receiver, the second receiver, and the transmitter to generate response signals for transmission over the transmitter. The response signals are generated in response to the processor receiving request signals from the first receiver or the second receiver.

Technical advantages of the present invention include providing an improved radio tag. In particular, a radio tag communicates at multiple radio frequencies. A first radio frequency is used for communications from a base station and a second radio frequency is used for communications from the radio tag.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, and in which:

FIG. 5 is a timing diagram illustrating first and second stage quench frequency oscillator outputs for the low power receiver of FIG. 4 in accordance with one embodiment of the present invention;

FIG. 10 is a flow diagram illustrating operation of the distributed asset control system in the retail facility of FIG. 9 in accordance with one embodiment of the present invention;

FIG. 13 is a block diagram illustrating a shipping facility using a distributed asset control system in accordance with still another embodiment of the present invention.

DETAILED DESCRIPTION OF THE INVENTION

Figure 1:
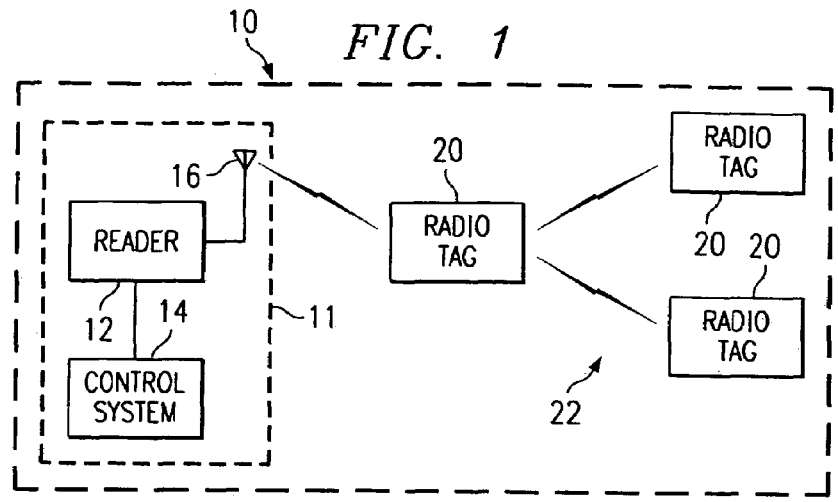
FIG. 1 is a block diagram illustrating a radio frequency identification (RFID) system in accordance with one embodiment of the present invention.

FIG. 1 illustrates a radio frequency identification (RFID) system 10 in accordance with one embodiment of the present invention. The RFID system 10 is a system used to track and identify objects or persons by attaching a transponder, or radio tag, to each object or person being tracked. The RFID system 10 communicates at one or more wireless frequencies including low frequencies (LF), very low frequencies (VLF), very high frequencies (VHF), ultra-high frequencies (UHF), microwaves, or other suitable frequencies.

Referring to FIG. 1, the RFID system 10 includes a base station 11 that resides at a fixed location and communicates with one or more radio tags 20 by an analog signal at a specified radio frequency. Radio tag 20 is a remote, portable, self-contained device that may be affixed to a moveable item, such as a person, inventory, or a vehicle.

The base station 11 is a conventional unit and includes a reader 12, a control system 14, and a base station antenna 16. Control system 14 may be implemented as a mainframe or other stand alone computer, server, personal computer, or any other type of computing device capable of controlling operation of the base station 11. Base station antenna 16 transmits and receives signals on various radio frequencies as necessary to provide communications between base station 11 and radio tags 20. Reader 12 acquires incoming signals from base station antenna 16 and demodulates the incoming signal for processing by control system 14. Reader 12 also modulates signals generated by control system 14 onto a carrier wave and transmits the modulated signal through base station antenna 16 as an analog communicated signal.

Signals are used within RFID system 10 to transmit messages between base station 11 and radio tags 20. Communicated signals destined for a specific radio tag 20 or the base station 11 are referred to as explicit communications since a specific destination device is referenced in the message. Other messages may be between base station 11 and all radio tags within RFID system 10. These communications are referred to as non-explicit, or global, communications since the message is not directed at a specific radio tag and requires a response or other suitable action from each radio tag receiving the message.

In one embodiment, analog communicated signals contain a message that requests radio tag 20 to perform some action such as responding to a query, forwarding a message, or initiating a query of surrounding radio tags 20. The analog communicated signals also contain a wakeup signature that precedes each message and informs radio tag 20 to prepare to receive an incoming message.

In accordance with one aspect of the present invention, each radio tag 20 includes logic and circuitry for retransmission of signals received from base station 11 and other radio tags 20. As used herein, the term each means every one of at least a subset of the identified items. Each radio tag 20 has an associated operational range that defines the area in which signals transmitted by radio tag 20 may be received by other devices such as radio tag 20 and base station 11. If radio tag 20 receives an explicit communication from base station 11 that identifies that radio tag 20 as the destination, radio tag 20 will process the message and transmit a response to base station 11. If another radio tag 20 is the destination for the explicit communication, the receiving radio tag 20 will retransmit the received message for reception by the destination radio tag 20.

If radio tag 20 receives a non-explicit communication from base station 11, radio tag 20 will process the received message, transmit a response to base station 11, and retransmit the message to other radio tags 20 within the operational range of radio tag 20.

The present invention uses slot allocation as taught by U.S. patent application Ser. No. 08/789,148 entitled Radio Tag System and Method with Improved Tag Interference Avoidance, incorporated herein by reference, to facilitate the transmission and retransmission of messages within RFID system 10.

In accordance with the retransmission capability of radio tag 20, the one or more radio tags 20 form a tag network 22 in which a radio tag 20 will retransmit a received message which is destined for another address. Each device, such as a radio tag 20 or base station 11, has a unique address within the RFID system 10. The destination address could be another radio tag 20 or base station 11. Since radio tags 20 are operable to retransmit received signals, radio tags 20 outside the operational range of base station 11 may communicate with base station 11 through other radio tags 20. The retransmission capability of radio tags 20 increases the operational range of both base station 11 and radio tags 20 so that additional base stations are not necessary to provide adequate coverage for RFID system 10. As a result, some radio tags 20 in RFID system 10 may exist outside the operational range of base station 11 and still function as part of RFID system 10. Radio tags 20 outside the operational range of the base station 11 transmit response messages to the base station 11 through other radio tags 20 closer in proximity to the base station 11.

In a particular embodiment, radio tags 20 are active radio tags that contain a local power source. As described in more detail below in connection with FIG. 2, active radio tags 20 may have internal processing capability to determine an appropriate response to an incoming message. Radio tags 20 may then transmit the response at a high power thereby increasing the operational range of the radio tag as compared to passive radio tags which do not contain a local power source.

Passive radio tags utilize the energy from an incoming message to modulate a fixed response onto the incoming signal and forward that signal with the modulated response back to the sending device. The operational range of passive tags is necessarily limited due to the lack of a local power source.

In accordance with another embodiment of the present invention, radio tag 20 may be a primary tag 20 assigned responsibility for one or more secondary tags 22 and 24. In accordance with this aspect of the invention, the primary tag 20 polls the secondary tags 22 and 24 to determine a status of monitored assets and reports the status or irregularities to the base station 11. Polling may be performed periodically on a timer basis or in response to a request from the base station 11 or other suitable device. In a particular embodiment, the primary radio tag 20 may be an active radio tag as previously described and the secondary tag 22 may be a passive tag.

Figure 2:
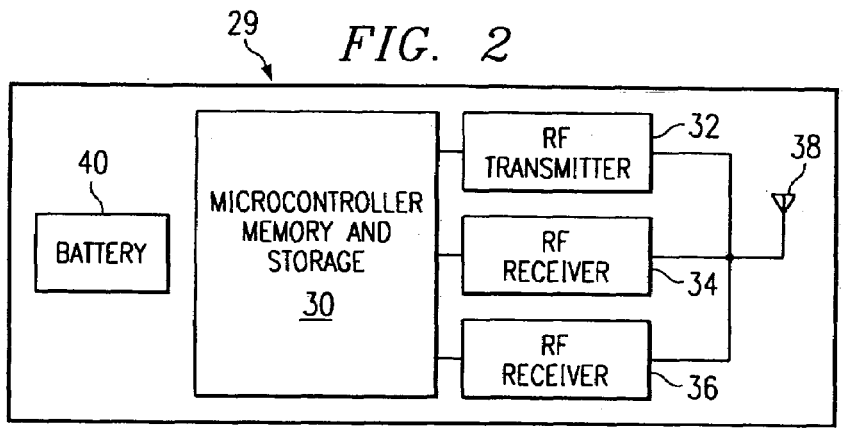
FIG. 2 is a schematic block diagram illustrating a multi-frequency wakeup radio tag for use in the RFID system of FIG. 1 in accordance with one embodiment of the present invention.

Primary tags 20 may perform distributed processing. The distributed processing capability of the present invention reduces processing responsibility of base station 11 and increases available bandwidth in the RFID system 10 since fewer messages are transmitted, received, and processed by the base station 11. FIG. 2 illustrates a radio tag 29 for use in the RFID system 10 of FIG. 1 in accordance with one embodiment of the present invention. In this embodiment, the radio tag 29 is a dual frequency radio tag that can be employed in a tag network 22 or as a primary tag. Although radio tag 29 will be described as a dual frequency radio tag, radio tag 29 may be generally described as a multiple frequency radio tag incorporating transmit and receive capabilities for one or more frequencies. It will be understood that other suitable radio tags capable of communication with other radio tags may be used in the RFID system 10.

The dual frequency radio tag 29 allows the radio tag 29 to communicate with the base unit at a first frequency and other tags at a second frequency. The use of dual frequencies allows the RFID system 10 to utilize a shorter range, more controllable frequency for communications between base station 11 and a set of radio tags 20 within its operational range. Since radio tags 20 should minimize power consumption, the second frequency provides broader coverage at low power levels as compared to the first frequency. The use of dual frequencies also allows radio tag 20 to determine whether a received signal came from base station 11 or other radio tags 20 without additional processing. Dual frequency as used herein refers to two or more frequencies utilized by radio tag 29. Thus, radio tag 29 may transmit signals on one or more frequencies and received signals on at least two frequencies.

The frequency spectrum includes three general ranges of frequencies suitable for RFID system applications. These ranges include kilohertz frequencies on the low end of the spectrum up to gigahertz frequencies at the high end of the spectrum. At the low end of the spectrum are very low frequencies (VLF) and low frequencies (LF). The VLF/LF frequencies have limited range, but signals transmitted on these frequencies are very controllable. Thus, they are particularly useful for applications requiring controlled transmission of signals to a specific geographic area. An example of an application for VLF/LF frequencies are providing wakeup signals to radio tags as they enter a specific area. The VLF/LF frequencies are generally not suitable for transmitting signals back to the base station since radio tags have insufficient power to overcome noise and other interference present in these frequency ranges.

The middle of the frequency spectrum includes very high frequencies (VHF) and ultra-high frequencies (UHF). These frequencies are characterized by low noise and reliable transmission. However, VHF/UHF frequencies cannot easily be directionally controlled. In addition, it is difficult to control range. Thus, these frequencies transmit in all directions. VHF/UHF frequencies are best suited for radio tag responses since the orientation between the base station 11 and radio tag 20 is irrelevant and signals may be transmitted at very low power since there is low noise present in these frequency ranges.

At the upper end of the frequency spectrum are microwaves. These frequencies can be made extremely directional and are very sensitive to environmental interference. Microwaves generally require a direct line of sight between transmitter and receiver. In general, microwave frequencies have limited application due to their extreme sensitivity to environmental interference. A specific application for microwave frequencies is an RFID system for a toll booth. Since microwaves are directional and can be focused, the base station 11 can transmit signals to a specific area where a vehicle, and thus its radio tags 20, will enter as it proceeds through the toll booth.

Referring to FIG. 2, dual frequency radio tag 29 includes an internal antenna system 38, a transmitter 32, a first frequency receiver 34, a second frequency receiver 36, a processor 30, and a local power source 40.

Internal antenna system 38 allows dual frequency radio tag 29 to transmit and receive radio frequency signals at specified frequencies. In one embodiment, the internal antenna system 38 is a dual antenna assembly. In another embodiment in which the frequencies are closely spaced, internal antenna system 38 is implemented using a conventional antenna with conventional switching circuitry allowing use of internal antenna system 38 with either transmitter 32, first frequency receiver 34, or second frequency receiver 36.

First frequency receiver 34 and second frequency receiver 36 each include a tuner circuit to receive and filter the signals at a specified frequency. The tuned and filtered signal is then demodulated creating a digital signal suitable for processing by processor 30. Processor 30 may be any suitable general purpose processor, microprocessor, or microcontroller. Processor 30 includes a processor unit, memory, and storage.

Local power source 40 may be a battery, solar cell system, or other suitable portable power source. In an exemplary embodiment, local power source 40 is a three volt lithium coin cell battery. The characteristic of a battery or power source connected to electrical components is a leakage of a certain quantity of electrical current into the electrical circuit. To maintain an adequate lifespan of radio tag 29, the circuitry of radio tag 29 is preferably configured to operate substantially on leakage current of local power source 40. By operating radio tag 29 on leakage current only, radio tag 29 may obtain a long shelf life of approximately 10 years before replacement of the local power source 40 is necessary.

The first and second frequency receivers 34 and 36 provide the dual frequency capability of radio tag 29. In a particular embodiment, the first frequency receiver 34 is a VHF/UHF receiver operable to receive wakeup signals in the VHF/UHF frequency range, and the second frequency receiver 36 is a VLF/LF receiver operable to receive signals in the VLF/LF frequency range. In this embodiment, base station 11 transmits signals in the VLF/LF frequency range and receives signals in the VHF/UHF frequency range, and radio tags 29 receive signals from base station 11 in the VLF/LF frequency range, receive signals from other radio tags 29 in the VHF/UHF frequency range, and transmit signals in the VHF/UHF frequency range. As previously described, use by the base station 11 of the VLF/LF frequency range allows base station 11 to control the transmission of the signals. Use by the radio tags 29 of the VHF/UHF frequency range allows signals to be transmitted at low power thus maximizing tag life.

The use of dual frequencies also allows the radio tag 29 to identify the type of unit transmitting the signal. If radio tag 29 receives a signal in VLF/LF receiver 36, it knows that the message was transmitted by the base station 11. Conversely, if radio tag 29 receives a signal on VHF/UHF receiver 34, it knows that the message was transmitted or forwarded by another radio tag 29.

In an exemplary embodiment, a low frequency of 132 kHz is used for the VLF/LF frequency range. The VHF/UHF frequencies are chosen based on local governmental restrictions on the use of these frequencies. In the United States, the VHF/UHF frequency may be a UHF frequency of 315 MHz. For European countries, the VHF/UHF frequency may be a UHF frequency of 433 MHz.

Tag processor 30 receives a message, or communicated signal, and determines if a response is necessary. If tag processor 30 determines that a response should be sent to base station 11 or another radio tag, transmitter 32 modulates the response signal from tag processor 30 onto an analog carrier wave and transmits the modulated signal via internal antenna 38.

Before tag processor 30 will process an incoming message, a wakeup signal signature may be required. This allows the tag processor 30 to remain in a low power, or sleep, state during periods of inactivity when the radio tag is outside the range of the base station 11 or is otherwise not communicating. The wakeup signal signature informs tag processor 30 that information requiring processing will arrive immediately following the wakeup signal signature.

Transmitter 32 modulates signals received from processor 30 onto a carrier wave for transmission via internal antenna 38. RFID system 10 preferably utilizes amplitude modulation to carry the communicated signal on the carrier wave. It will be understood that other suitable modulation schemes may be used. In the embodiment in which the tags communicate at a frequency within the VHF/UHF frequency range, the transmitter 32 is a VHF/UHF transmitter. As previously described, the VHF/UHF frequency range is characterized by low noise in the frequency spectrum. However, signals transmitted in this frequency range are not controllable. Thus, signals are dispersed in all directions. The low noise characteristic of VHF/UHF frequencies allows low powered signals to be transmitted. Since power consumption should be kept to a minimum so that radio tags in RFID system 10 obtain a maximum life expectancy, a low powered transmitter should be utilized. Although radio tags 29 transmit high powered signals in the VHF/UHF frequency range and can obtain an operational range up to 1,000 feet, a particular embodiment limits transmitted signal power such that the operational range of radio tags 29 is limited to approximately 150 feet.

Figure 3:
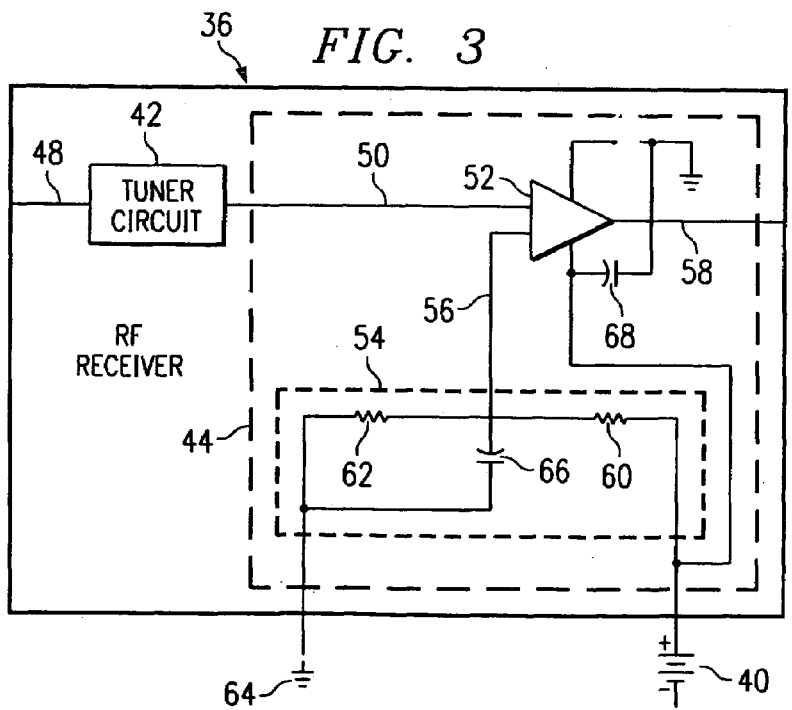
FIG. 3 is a schematic block diagram illustrating a high sensitivity receiver for the radio tag of FIG. 2 in accordance with one embodiment of the present invention.

FIG. 3 illustrates the second frequency receiver 36 of FIG. 2 in accordance with one embodiment of the present invention. In this embodiment, second frequency receiver 36 is a low power high sensitivity VLF/LF receiver. Although this embodiment utilizes the VLF/LF frequency range, other suitable frequency ranges may be used.

Referring to FIG. 3, second frequency receiver 36 includes a tuner circuit 42 that is tuned to the transmitting frequency of base station 11 and a demodulator 44. Tuner circuit 42 is coupled to internal antenna system 38 and receives a signal 48 therefrom.

Tuner circuit 42 eliminates extraneous signals which may cause false activations of radio tag 29 by filtering frequencies other than a target frequency. Tuner circuit 42 may include conventional tuner circuitry such as a high pass filter comprised of a capacitor in series with a resistor connected to a ground. Tuner circuit 42 effectively narrows the bandwidth of the signal 48 received and forwarded by internal antenna system 38. In an exemplary embodiment, tuner circuit 42 is set to 132 KHZ but may be set to any suitable frequency.

After tuner circuit 42 obtains and filters the received signal 48, the tuned and filtered signal is forwarded to demodulator 44. Demodulator 44 demodulates the received signal and extracts the communicated signal in the form of a square wave, or digital bit stream, for processing by processor 30. As described in more detail below, demodulator 44 has a high sensitivity so that it can detect and demodulate low powered signals. In one embodiment, the demodulator has a sensitivity of less than 10 millivolts. As a result, the radio tag 29 can detect and process weak signals at LF/VLF which may significantly increase the operational range of radio tag 29 to 150 feet and beyond.

After demodulator 44 extracts the communicated signal from the carrier wave, the communicated signal is forwarded to tag processor 30 for processing. As previously described, before processor 30 will process an incoming message, a wakeup signal may be required. The wakeup signal signature may also be used to eliminate false activations of radio tag 29. False activations may occur when utilizing a low threshold voltage level in demodulator 44. False activations of radio tag 29 are eliminated in part by tuner circuit 42 that only allows signals at a target frequency to pass into demodulator 44. By utilizing a wakeup signal signature, the remainder of potential false activations may be effectively eliminated or reduced while still providing a high sensitivity demodulator.

The demodulator 44 includes a comparator 52 and a threshold voltage generator 54. The threshold voltage generator 54 generates a threshold voltage signal that is used by the comparator 52 to demodulate an incoming signal and determine if a communicated signal is present. Comparator 52 should be in an active state at all times so that it is prepared to sample any signal that may be obtained by internal antenna 38. Since comparator 52 is always active, threshold voltage generator 54 is always active and both continuously draw current from local power source 40. The comparator provides high sensitivity at low power consumption levels and this increases the range of the radio tag 29 without limiting its effective life.

Comparator 52 has a first input 50, a second input 56, and an output 58. The first input 50 is coupled to the tuner circuit 42 after receives signal 48 has been tuned and filtered to receive the tuned signal. The second input 56 is coupled to the threshold voltage generator 54 to receive the threshold voltage signal. The output 58 is coupled to tag processor 30.

The comparator 52 is connected to local power source 40 and preferably operates on leakage current of the local power source 40. In one embodiment, the link between local power source 40 and comparator 52 has a capacitor 68 for regulation of the electrical current supplied to comparator 52. This prevents fluctuations in local power source 40 current from adversely affecting operation of the comparator 52.

In operation, comparator 52 demodulates the tuned signal by comparing it to the threshold voltage signal generated by threshold voltage generator 54. The digital output on output 58 is based on the results of the comparison. If the tuned signal exceeds the threshold voltage signal, comparator 52 generates a high output for the digital signal on output 58. If the tuned signal is less than threshold voltage signal 56, comparator 52 generates a low output on digital signal 58. A high output corresponds to an "on" bit, and a low output corresponds to an "off" bit. Tag processor 30 receives the digital signal on output 58 and determines an appropriate response to be transmitted to base station 11 or other radio tags.

The propagation delay of comparator 52 determines the sampling rate of the incoming signal. The propagation delay of comparator 52 is dependent on the specific frequency which must be captured, demodulated, and processed. Generally, a propagation delay of seven to ten times less than the period of the carrier wave being processed is sufficient to fully capture the communicated signal. Thus, seven to ten samples would be taken of the incoming signal during each period. In the exemplary embodiment where the carrier wave has a frequency of 132 KHz, the comparator 52 has a period of 7.6 microseconds and a propagation delay of 900 nanoseconds which yields approximately eight samples per cycle of the carrier wave. The tag processor 30 accumulates and interprets the samples.

Conventional comparators satisfy the low power requirements but are impractical for application to an RFID tag as the propagation delay at low overdrive signals (i.e. 10 mv) is in excess of twelve microseconds. As described below, the comparator 52 may be implemented by fabricating the novel comparator.

In a preferred embodiment, comparator 52 may be implemented in an application specific integrated circuit (ASIC). In this embodiment, the comparator 52 may have a conventional design but be fabricated using complimentary metal oxide semiconductor (CMOS) techniques at a sub 0.35 micron process, such as Hewlett-Packard's MOSES process. Comparator 52 of this embodiment has a typical propagation delay of 900 nanoseconds and a maximum propagation delay of one microsecond at less than 10 millivolts overdrive using two to three microamps of current from a local power supply 40 (lithium coin cell battery) over an extended temperature range with CMOS compatible outputs on a 0.35 micron process. Comparator 52 is implemented using a low power, sub-micron CMOS process to properly balance the tradeoffs between power consumption and performance that currently available comparators inadequately address.

An exemplary embodiment utilizes a comparator with a propagation delay of 900 nanoseconds and a power consumption between two and three microamps. Since threshold voltage generator 54 draws approximately 997 nanoamps and comparator 52 draws approximately three microamps, the total power consumption of demodulator 44 is less than four microamps which will yield an adequate shelf life and is less than the leakage current of local power source 40.

The threshold voltage generator 54 may be implemented as a voltage divider circuit. In this embodiment, the threshold voltage generator 54 has a first resistor 60, a second resistor 62 and a capacitor 66. A first resistor 60 is coupled to local power source 40. First resistor 60 should have a resistance high enough to minimize the leakage current flow while still providing sufficient leakage current to generate threshold voltage signal 56. If the resistance of first resistor 60 is too high, insufficient current will be available to generate threshold voltage signal 56. If the resistance of first resistor 60 is too low, excessive current will be drawn from local power source 40 and inadequate shelf life will result.

A second resistor 62 is placed in series with first resistor 60 and is connected to a ground 64. The resistance of second resistor 62 is chosen to generate the appropriate voltage for threshold voltage signal 56. By varying the resistance of second resistor 62, the sensitivity of demodulator 44 may be varied. An increase in the resistance of second resistor 62 results in lower sensitivity of demodulator 44.

Capacitor 66 is connected across second resistor 62 in order to insure that a constant voltage is provided on threshold voltage signal 56. Capacitor 66 insures that the sensitivity of comparator 52 is constant and does not fluctuate with any fluctuations in the current supplied by local power source 40.

In the exemplary VLF/LF embodiment, a three megaohm resistor is used as first resistor 60 and a 6.8 kiloohm resistor is used as second resistor 62. The total current drawn by threshold voltage generator 54 is $I=E/R$, where I is current in amps, E is energy in volts, and R is resistance in ohms. Utilizing a three volt local power source 40 and having a total resistance from the resistances of first resistor 60 and second resistor 62 of 3,006,800 ohms, the total current drawn by the threshold voltage generator 54 is 3V/3,006,800 ohms=997 nanoamps. Therefore, threshold voltage generator 54 draws less than 1 microamp from battery 44. The threshold voltage signal may be calculated as $E(R2)/(R1+R2)$, which is 3V(6800 ohms)/(3,006,800 ohms), or 6.8 millivolts. Therefore, any received signal which exceeds 6.8 millivolts may be processed.

Figure 4:
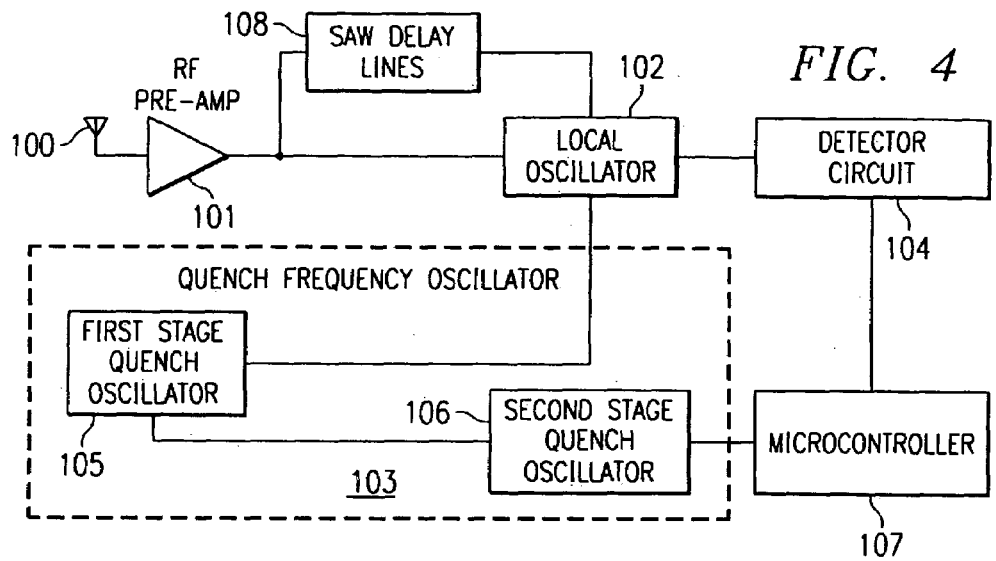
FIG. 4 is a block diagram illustrating a low power receiver for the radio tag of FIG. 2 in accordance with one embodiment of the present invention.

FIG. 4 illustrates details of the first frequency receiver 34 in accordance with one embodiment of the present invention. In this embodiment, the first frequency receiver 34 is a low power super regenerative receiver. Other suitable receivers and receiver designs may be used. Power control functions of a superregenerative receiver permit some of the elements of VHF/UHF receiver 34 to be completely shut down to save tag power while operating in a quiescent state. The superregenerative receiver 34 includes the amplification stage 101, the local oscillator 102 operating at the certain frequency, quench frequency source 103 operating at a duty cycle of at least 10 times the data rate, and a detector stage 104. The design utilizes forward biasing as provided by the quench frequency such that power draw is limited to 50% of the normal 100% biasing techniques due to the 50% duty cycle of the quench. Amplifier power 101, is limited to less than leakage currents only (generally less than 500 nanoamps) when the quench frequency is shut down.

Additionally, the local oscillator (LO) 102 is controlled by the quench frequency such that it is turned off prior to achieving stable oscillation. In this way, the RF is sampled as the LO 102 is able to achieve stable oscillation significantly faster in the presence of an RF signal than without an RF signal. The detector circuit simply filters out the quench and LO frequencies (low pass filters) leaving the pulse created by the increased size of the RF envelope with RF present.

Since the LO 102 is also turned on and off by the quench frequency, power can also be controlled in the same way as the front end amplifier 101 biasing described above. A Surface Acoustic Wave (SAW) Delay Line 108 (in a preferred embodiment Model No. SL1011 from RF Monolithics, and in alternate embodiments any of the SLXXXX series of devices or equivalents) provides stability to the LO frequency and inserts the proper timing for signal reception 100, amplification 101, and quench 103 sampling of the LO 102.

In the configuration illustrated in FIG. 4, the quench frequency oscillator 103 actually includes two separate oscillators, first and second stage quench oscillators 105 and 106, that operate in one of two modes and that are referred to as quench oscillator full power mode and quench oscillator low power mode. In low power quiescent mode, the oscillator 103 outputs a quench signal 120 as in FIG. 5. A duty cycle of 1 to 5% over a period of 10 ms provides sufficient time for reception of a 20 to 30 ms activation signal and reduces total circuit draw by as much as 99%. The high pulse consists of a 30 to 500 khz 50% duty cycle trapezoidal pulse train for normal quenching of the local oscillator 102. When a signal is detected, microcontroller 107 turns off the low duty cycle such that the 50% 30 to 500 khz normal quench frequency signal 130 is maintained for normal data retrieval.

The detector circuit 104 is a micropower diode/comparator arrangement, although other more efficient types of detectors can be implemented in alternate embodiments as long as the power requirement is 1 microamp or less to minimize the total circuit power requirement. In the detector circuit 104, low power consumption is achieved through use of conventional low power componentry, e.g., in a preferred embodiment a model MAX 417 dual op-amp device from Maxim (not shown). In a preferred embodiment, detector circuit 104 operates as follows: The output of quench frequency oscillator 103, as integrated with the local oscillator 102, is first passed through a low pass filter (not shown) and applied to the first op-amp of the Maxim device to amplify the resulting signal sufficiently to be applied to the second op-amp of the Maxim device, which is configured as a comparator creating a data pulse from detector circuit 104 when triggered. This data pulse is then applied to microcontroller 107 to indicate that quench frequency oscillator 103 should be placed in full power mode by setting the second stage quench oscillator output to a stable high output state 140.

The quench frequency oscillator 103 comprises the first stage quench oscillator 105 and the separate, second stage quench oscillator 106. The first stage quench oscillator 105 is coupled to the local oscillator 102 and operable, when active, to activate the local oscillator 102. The second stage quench oscillator 106 is coupled to the first stage quench oscillator 105 and operable in a low power mode to periodically activate the first stage quench oscillator 105 in order to periodically activate the local oscillator 102 for the purpose of detecting the presence of a communicated signal and in a full power mode to continuously activate the first stage quench oscillator in order to continuously activate the local oscillator 102 for the purpose of collecting the communicated signal. When continuously activated, the local oscillator 102 and first stage quench oscillator 105 may each have a fifty percent or other suitable duty cycle for full or desired sensitivity reception. The communicated signal is a signal communicated to the radio tag 29. The communicated signal may be an ultra high frequency (UHF) or other suitable signal. It will be understood that the quench oscillator 102 may instead be a dual quench oscillator and that the receiver may comprise other types of suitable receivers operating on a limited power supply, such as a coin cell battery, and may include other suitable circuits and components.

Figure 6:
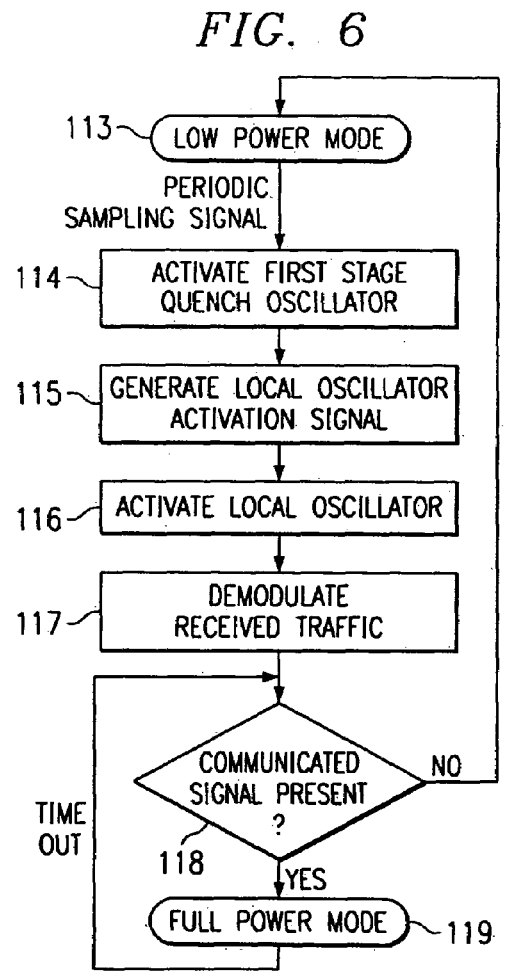
FIG. 6 is a flow diagram illustrating the operation of the low power receiver of FIG. 4 in low and full power modes.

FIG. 6 is a flow diagram illustrating operation of the superregenerative receiver 34 in accordance with one embodiment of the present invention. Referring to FIG. 6, the method begins at state 113 in which the quench oscillator 103, and thus the receiver 34, is in the low power mode. The radio tag 29 is in sleep or stand-by mode. In the low power mode, the receiver 34 preferably uses only leakage current from a battery for the radio tag 29. For a radio tag 29 operating on a typical lithium coin cell battery, for example, the receiver 34 in the low power mode uses 500 nanoamps or less power. As a result, the receiver 34 need not use active current from the battery, and life of the battery and the radio tag 29 are extended.

In the low power mode, the second stage quench oscillator 106 has a low duty cycle that periodically generates a first stage activation, or sampling, signal to detect whether a signal is present. The duty cycle may be less than five percent and in the preferred embodiment is about one percent. The duty cycle should be sufficient to enable sampling of traffic being received such that the presence of signals can be detected while minimizing power consumption.

In response to the periodic sampling signal, state 113 transitions to step 114 in which the first stage quench oscillator 105 is activated by the sampling signal. In a particular embodiment, the first stage quench oscillator 105 is active only in the presence of the sampling signal. Thus, the first stage quench oscillator 105 will activate based on the duty cycle of the second stage quench oscillator 106.

Proceeding to step 115, the first stage quench oscillator 105 generates a local oscillator activation signal. At step 116, the local oscillator 102 is activated in response to the activation signal from the first stage quench oscillator 105. In a particular embodiment, the local oscillator 102 is acting only in the presence of the local oscillator activation signal. Thus, in the low power mode, the local oscillator 102 will activate based on the duty cycle of the second stage quench oscillator 106.

Next, at step 117, the local oscillator 102 demodulates received traffic to generate a demodulated signal. The local oscillator 102 demodulates received traffic at a specified frequency. The communicated signals are traffic modulated at that specified frequency.

Proceeding to decisional step 118, the detector 104, in combination with the microcontroller 107, determines whether a communicated signal is present in the demodulated signal output by the local oscillator 102. If a communicated signal is not present, the radio tag 29 may return to stand-by, or sleep mode. Accordingly, the NO branch of decisional step 118 returns to the low power mode at state 113 in which the second stage quench oscillator 106 remains at the low duty cycle to minimize power consumption.

Returning to decisional step 118, if a communicated signal is present in the demodulated signal, the communicated signal needs to be collected and the YES branch of decisional step 118 leads to state 119. At state 119, the second stage quench oscillator 106, and thus the quench oscillator 103 and the receiver 34, transition to full power mode. In the full power mode, the second stage quench oscillator 106 has a full duty cycle to continuously activate the first stage quench oscillator 105. In response, the first stage quench oscillator 105 continuously activates the local oscillator 102 for full sensitivity reception and the communicated signal is demodulated and collected. Accordingly, full power is used only when a communicated signal is present and needs to be collected.

The receiver 34 remains at state 119 until the communicated signal has been fully received. After complete reception of the communicated signal, in response to a timeout or other suitable event, state 119 returns to decisional step 119 in which it is determined if another communicated signal is present. If a communicated signal is present and being received, the receiver 34 is returned to state 119 and remains in full power mode at least until the communicated signal is fully collected. Following collection of the communicated signal, and the absence of a further communicated signal, the NO branch of decisional step 118 returns to state 113 in which the second stage quench oscillator 106, and thus the receiver 34, are in the low power mode. Accordingly, the receiver 34 is maintained in full power mode only as long as necessary to collect a communicated signal and, if desired, for a short period thereafter. In this way, by using a second mode of operation or a second quench oscillator, at a substantially lower frequency, substantial power savings are realized. In the low power mode, sampling the radio frequency takes place at a duty cycle that is conducive to long battery life. Once a radio frequency input signal is detected, the higher frequency quench is turned on and full sensitivity is achieved. This could all be timed such that the full turn on of the unit is accomplished during transmission of a preamble from the transmitting device.

The microcontroller 107 provides binary outputs to control the mode of operation. The controller 107 operates in a low power sleep state until the pulse from the low power, low duty cycle quench is detected via some incoming radio frequency and is awakened. The controller 107 then immediately upon awakening turns off the low duty cycle mode and turns on the normal quench frequency controller and searches for valid radio frequency pulses for demodulation. Once the pulses have stopped for some period, the controller 107 turns off normal quench, turns on low power quench and goes back to low power sleep mode.

Figure 7:
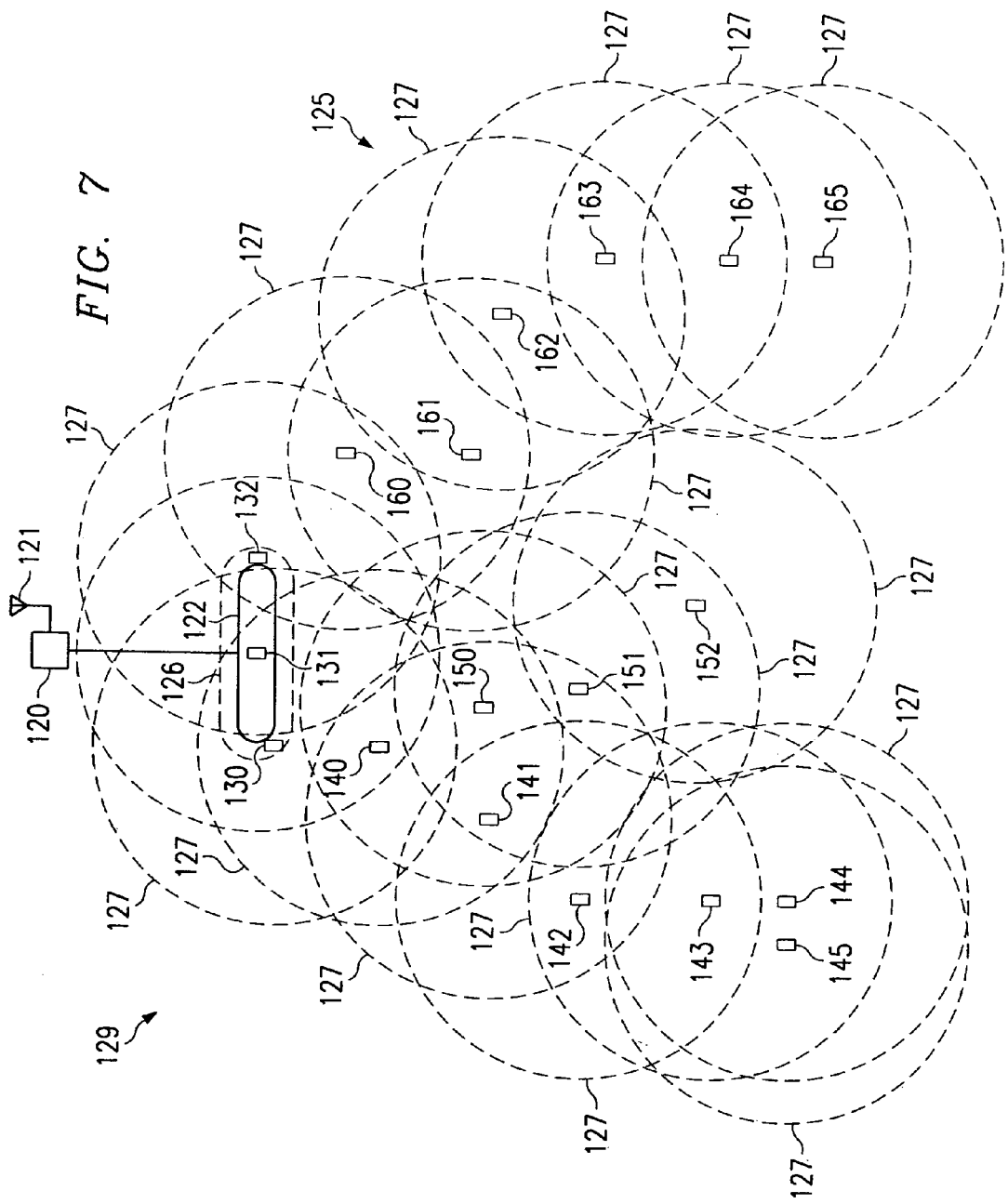
FIG. 7 is a block diagram illustrating an asset tracking system using the radio tag of FIG. 2 to form a tag network in accordance with one embodiment of the present invention.

FIG. 7 illustrates an asset tracking system 129 in accordance with one embodiment of the present invention. In this embodiment, an automobile storage facility for temporarily storing vehicles before the vehicles are transported to retail facilities is used to describe the operation of the asset tracking system. In that embodiment, vehicles may be stored at the automobile storage facility after manufacture or after importation. The asset tracking system 129 of the present invention may be used with other suitable applications where inventory or other items of interest are distributed over large areas.

Referring to FIG. 7, the asset tracking system 129 includes a base station 120 and a tag network 125. The base station 120 is similar to the previously described base station 11. Tag network 125 includes a plurality of dual frequency radio tags 130-165. Dual frequency radio tags 130-165 are similar to the previously described radio tag 29 and are operable to transmit and/or receive on multiple frequencies. It will be understood that single frequency tags may be used within the tag network 125.

The base station 120 may include a dual mode antenna as previously described or separate antennas for the different frequency ranges transmitted and received by base station 120. For a VHF/UHF and VLF/LF embodiment, base station 120 uses separate antennas for VHF/UHF frequencies and VLF/LF frequencies. A VHF/UHF antenna 121 is coupled to base station 120 and is operable to receive messages from dual frequency radio tags 130-165 transmitted on the VHF/UHF frequency. The VLF/LF frequency range is used to transmit signals from base station 120 to radio tags 130-165. Because VLF/LF frequencies have limited transmission distance, a large loop antenna is used to disperse the message transmitted on the VLF/LF frequency over an area determined to reach a number of radio tags within radio tags 130-165 in order to propagate the message over the entire vehicle storage facility.

In a particular embodiment, VLF/LF antenna 122 is a 20 foot by 100 foot loop antenna. Base station 120 generates signals at a power level determined to disperse the signals approximately 15 to 20 feet on either side of VLF/LF antenna 122. Thus, base station 120 has a VLF/LF frequency operational range 126 of approximately 60 feet by 140 feet. The operational range is the maximum area covered by a device or a suitable portion of that area. Radio tags within the operational range of base station 120 will receive signals from base station 120 on a VLF/LF frequency receiver. Radio tags outside the operational range of base station 120 will receive signals propagated through the tag network 125 using the previously described retransmission capability of the radio tags 130-165. Each radio tag 130-165 in tag network 125 has an operational range 127 illustrated by hashed circles.

A specific example of an asset tracking system in accordance with the asset tracking system illustrated in FIG. 7 is a vehicle storage facility used for storing imported vehicles after the vehicles are unloaded from a ship. Before entering the vehicle storage facility, a dual frequency radio tag similar to radio tag 29 is attached or otherwise coupled to each vehicle for tracking and identification purposes. An asset tracking system used in this way will allow efficient tracking of a large number of vehicles held in inventory while awaiting transport to retail facilities across the country. The tag network 125 of FIG. 7 will be discussed referring specifically to the import vehicle lot example.

In the vehicle storage facility embodiment, outbound messages from base station 120 are generally non-explicit communications such as an inventory request message, and inbound messages are generally explicit communications, such as responses to base station 120 for an inventory request message.

Base station 120 may be located anywhere in the vehicle storage facility. The operational range of base station 120 and radio tags within tag network 125 are sized such that at least one radio tag is within the operational range of base station 120 and all other radio tags in tag network 125 are within the operational range of at least one other radio tag. Sizing the operational ranges of base station 120 and radio tags in tag network 125 ensures that messages sent by base station 120 or a radio tag in tag network 125 reach an appropriate destination or destinations.

In operation, base station 120 may periodically take inventory of the vehicle storage facility, verify that a particular vehicle is within the facility or obtain locational or other information about a vehicle. Base station 120 may be loaded with expected inventory by entering each vehicle into inventory as it enters the vehicle storage facility and removing each vehicle from inventory as it exits the vehicle storage facility. After base station 120 takes inventory of the vehicle storage facility, base station 120 may compare the inventory results with the expected inventory in order to identify potentially missing vehicles.

When base station 120 takes a periodic inventory of the vehicle storage facility, base station 120 generates a non-explicit message requesting that all radio tags 130-165 in tag network 125 respond. Recall that non-explicit messages are broadcast messages with no specific target or destination address. Thus, all radio tags 130-165 in tag network 125 receiving the message will respond to base station 120 and forward the message to other radio tags. The responses received by base station 120 can be compared to the expected inventory and missing, or unaccounted for, vehicles can be identified.

Communications within an asset tracking system 129 utilize acknowledgments and resending of messages in order to ensure that messages are received as intended. After a message is transmitted, any tag receiving that message will issue an acknowledge response or an unacknowledged response. An acknowledge response informs the transmitting radio tag that the message was successfully received. An unacknowledged response informs the transmitting radio tag that only a portion of the message was received and that the message should be retransmitted. If the transmitting device does not receive an acknowledge or unacknowledged response within a specified period of time, the transmitting device will retransmit the message a fixed number of times to insure that any radio tag within the operational range of the transmitting device receives the message. In a particular embodiment, messages are retransmitted a maximum of three times. If the acknowledge message is not received within a predetermined time, the message is retransmitted a fixed number of times before the destination radio tag is considered not found or missing. Since a message can be retransmitted and received multiple times by a radio tag, radio tags include logic to prevent a particular radio tag from responding to a particular message more than one time. In one embodiment, the logic to prevent multiple responses to a particular message includes adding a transaction number to each message so that a radio tag only responds once to a particular transaction number. In one embodiment, the transaction number is randomly generated at the radio tags and sequentially generated at the base station.

In the exemplary embodiment, base station 120 transmits the non-explicit inventory request message on the VLF/LF frequency via VLF/LF antenna 122. Radio tags in tag network 125 that exist within the operational range 126 of base station 120 receive the inventory request message on an internal receiver similar to the previously described second frequency receiver 36. The receiving radio tags 130-132 acknowledge receipt of the message, process the message and respond accordingly, and retransmit the message to other radio tags within tag network 125. The inventory request message is retransmitted through tag network 125 such that all radio tags receive the message. As responses are generated by radio tags in tag network 125, other radio tags receive and retransmit the responses until they reach base station 120.

In the exemplary embodiment, radio tags 130-132 exist within the operational range 126 of base station 120 and receive the inventory request message on a VLF/LF receiver 36 in each radio tag. The inventory request message is preceded by a wake up signal identifier. Radio tag 130 receives the inventory request message and generates an explicit communication to base station 120 acknowledging receipt of the inventory request message. Radio tag 130 then generates an appropriate response to base station 120. A response generated by a radio tag will generally identify the address of the radio tag generating the response and the destination address of the device to receive the response. In this case, the response generated by radio tag 130 would identify radio tag 130 as the generating device address and base station 120 as the destination device address since base station 120 initiated the inventory request message.

After transmitting a response to base station 120, radio tag 130 retransmits the inventory request message through its internal VHF/UHF transmitter 32. Radio tag 140 receives the inventory request message on its internal VHF/UHF receiver 34. Radio tag 140 first acknowledges receipt of the inventory request message and then generates and transmits an appropriate response to the inventory request message. Radio tag 140 then retransmits the inventory request message to other radio tags. Radio tag 130 receives the acknowledge message and the response generated by radio tag 140. Since the response is an explicit communication directed toward base station 120, radio tag 130 retransmits the response to base station 120.

The inventory request message continues in tag network 125 through radio tags 141-145. Each radio tag 141-145 receives the inventory request message, generates an acknowledge message to the radio tag that forwarded the inventory request message, generates an appropriate response, and retransmits the original inventory request message. Each radio tag in the tag network 125 may receive and retransmit an explicit response directed to base station 120. In this way, inventory request messages generated by base station 120 are propagated through tag network 125 and any responses directed to base station 120 flow through the tag network 125 to base station 120.

Radio tag 150 is outside the operational range 126 of both base station 120 and, the operational range 127 of radio tag 130. However, it is within the operational range 127 of radio tag 140. Therefore, when radio tag 140 retransmits the inventory request message, radio tag 150 receives the inventory request message, generates an acknowledge message to radio tag 140, and generates an appropriate response to base station 120. Radio tag 150 then propagates the inventory request message through radio tags 150-152 in tag network 125 by retransmitting the inventory request message.

Radio tag 132 is within the operational range 126 of base station 120 and functions as the link between base station 120 and radio tags 160-165 in tag network 125. Messages are transmitted and received through radio tags 160-165, in tag network 125 as previously discussed with relation to radio tags 140-145 and radio tags 150-152.

Radio tag 131 exists within the operational range 126 of base station 120 and receives and responds accordingly to the inventory request message generated by base station 120. Because radio tags already within the operational range 127 of radio tag 131 are activated by other tags, radio tag 131 does not further activate any other radio tags in tag network 125 and does not perform communications between radio tags in tag network 125.

Figure 8B:
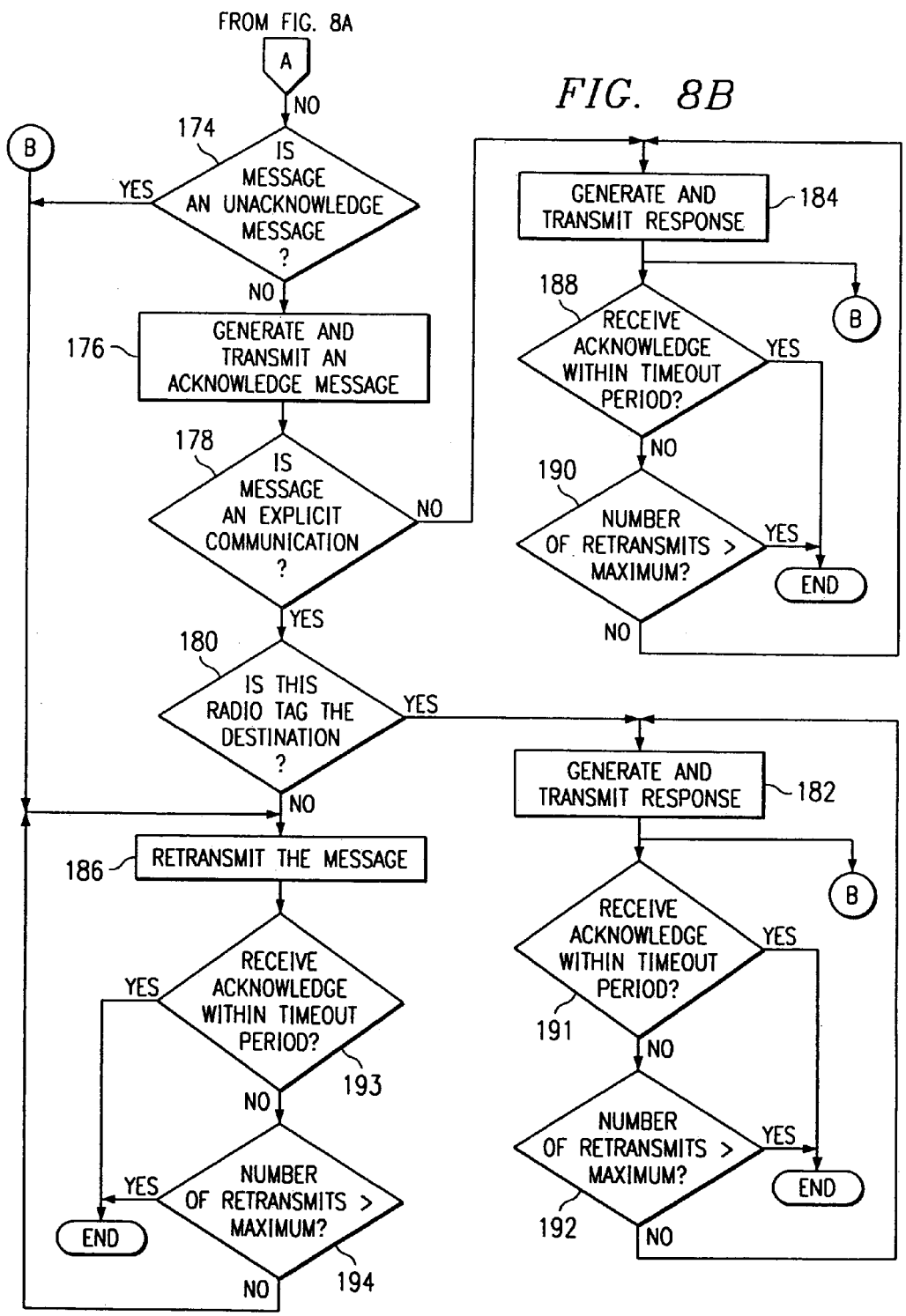
FIG. 8 is a flow diagram illustrating the operation of a radio tag in the asset tracking system of FIG. 7 in accordance with one embodiment of the present invention.

FIG. 8 illustrates the operation of a radio tag in tag network 125 in one embodiment of asset tracking system 129. Before the process illustrated in FIG. 8 commences, the radio tag receives an appropriate wakeup signature and prepares to receive an incoming message. The incoming message could be a non-explicit communication from base station 120, an explicit communication from base station 120, a message retransmitted by another radio tag, an acknowledge message, an unacknowledged message or other suitable message.

The method begins at step 170 where a dual frequency radio tag receives a signal containing a message. Internal antenna system 38 obtains the signals and forwards the signals to VHF/UHF receiver 34 and VLF/LF receiver 36. VHF/UHF receiver 34 and VLF/LF receiver 36 tune and demodulate the signal to generate a digital bit stream containing the message for processing by processor 30.

The method proceeds to decisional step 171 where processor 30 determines whether a complete message has been received. If a complete message has not been received, the NO branch of decisional step 171 proceeds to step 172 where the radio tag generates and transmits an unacknowledged message. After step 172, the process terminates and waits for retransmission of the partially received message.

If a complete message has been received either initially or upon retransmission, the YES branch of decisional step 171 proceeds to decisional step 173 where processor 30 determines if the message is an acknowledge message for a message recently transmitted by the radio tag. If the message is an acknowledge message for a message recently transmitted by the radio tag, no further processing is necessary and the YES branch of decisional step 173 leads to the end of the method. If the message is not an acknowledge message, the NO branch of decisional step 173 leads to decisional step 174 where processor 30 determines whether the message is an unacknowledged message for a recently transmitted message by the current radio tag. If the message is not an unacknowledged message for a recently transmitted message by the current radio tag, the NO branch of decisional step 174 proceeds to step 176 where the radio tag generates and transmits an acknowledge message to acknowledge receipt of the current message.

Proceeding to decisional step 178, the tag processor 30 determines whether the message is an explicit communication. If the message is an explicit communication, the YES branch of decisional step 178 proceeds to decisional step 180 where the processor 30 determines whether the radio tag is the destination for the explicit message. If the current radio tag is the destination for the explicit message, the YES branch of decisional step 180 proceeds to step 182 where the radio tag generates and transmits an explicit response to the originating device, in this embodiment, base station 120.

The method proceeds to decisional step 191 where the radio tag determines if an acknowledge message has been received within the time out period. As previously discussed, the time out period is a waiting period before the radio tag will retransmit the message. If an acknowledge message is received within the time out period, the YES branch of decisional step 191 leads to the end of the method. If an acknowledge message is not received within the time out period or upon receipt of an unacknowledged message, the NO branch of decisional step 191 proceeds to decisional step 192 where the radio tag determines whether the message has been retransmitted the maximum number of times. If the radio tag determines that the maximum number of retransmissions has been reached, the YES branch of decisional step 192 leads to the end of the method. If the radio tag determines that the maximum number of retransmissions has not been reached, the NO branch of decision step 192 returns to step 182 where the response is transmitted.

Returning to decisional step 178, if the message is not an explicit communication, the NO branch of decisional step 178 proceeds to step 184 where the radio tag generates and transmits an appropriate response to the originating device. In the exemplary embodiment, base station 120 is the originating device for non-explicit messages within the asset tracking system 129. The method proceeds to decisional step 188 where the radio tag determines if an acknowledge message has been received within the time out period. As previously discussed, the time out period is a waiting period before the radio tag will retransmit the message. If an acknowledge message is received within the time out period, the YES branch of decisional step 188 leads to the end of the method. If an acknowledge message is not received within the time out period or upon receipt of an unacknowledged message, the NO branch of decisional step 188 proceeds to decisional step 190 where the radio tag determines whether the message has been retransmitted the maximum number of times. If the radio tag determines that the maximum number of retransmissions has been reached, the YES branch of decisional step 192 leads to the end of the method. If the radio tag determines that the maximum number of retransmissions has not been reached, the NO branch of decision step 192 returns to step 184 where the response is transmitted.

Returning to decisional step 174, if the received message is an unacknowledged message, the YES branch of decisional step 174 proceeds to step 186 where the message that was partially received by another device is retransmitted. Similarly, at decisional step 180, if the current radio tag is not the destination for the explicit message, the NO branch of decisional step 180 proceeds to step 186 where the current message is retransmitted.

After step 186, the method proceeds to decisional step 193 where the radio tag determines if an acknowledge or unacknowledged message has been received within the time out period. As previously discussed, the time out period is a waiting period before the radio tag will retransmit the message. If an acknowledge message is received within the time out period, the YES branch of decisional step 193 leads to the end of the method. If an acknowledge message is not received within the time out period or an unacknowledged message is received, the NO branch of decisional step 193 proceeds to decisional step 194 where the radio tag determines whether the message has been retransmitted the maximum number of times. If the radio tag determines that the maximum number of retransmissions has been reached, the YES branch of decisional step 194 leads to the end of the method. If the radio tag determines that the maximum number of retransmissions has not been reached, the NO branch of decision step 194 returns to step 186 where the appropriate message is retransmitted.

Figure 9:
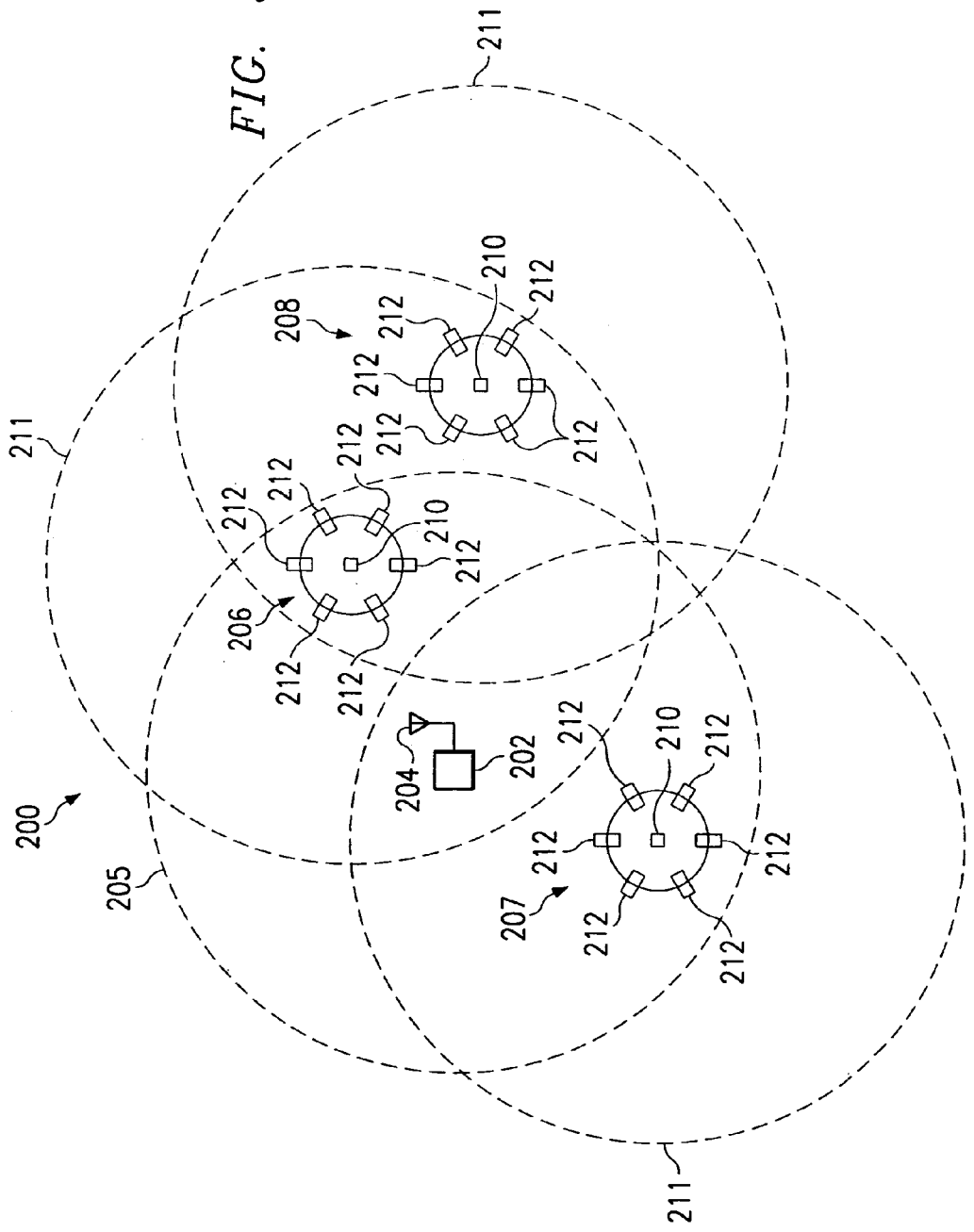
FIG. 9 is a block diagram illustrating a retail facility using a distributed asset control system in accordance with one embodiment of the present invention.

FIG. 9 illustrates a distributed asset control system 200 in accordance with another aspect of the present invention. In this embodiment, the distributed asset control system 200 may be used, for example, to track expensive garments on hanging racks located throughout a retail facility. Distributed asset control system 200 may be used in a variety of situations including other retail and office asset management systems to monitor assets.

Referring to FIG. 9, the distributed asset control system 200 includes a base station 202 and a plurality of primary tags 210. Each primary tag 210 is functionally associated to a set of secondary tags 212. A dual mode antenna 204 as previously described is part of base station 202. In an exemplary embodiment, primary tag 210 is a dual frequency radio tag 29 as previously described. The base station 202 includes a reader and control system similar to base station 11. The base station 202 is located in a facility to be monitored such that at least one primary tag 210 is within the operational range 205 of base station 202. The operational range 211 of each primary tag 210 is set such that a message transmitted by base station 202 will be received and propagated to each primary tag 210 within distributed asset control system 200.

Dual mode antenna 204 may transmit and receive signals in the VLF/LF frequency range and the VHF/UHF frequency range. Although the present embodiment will be discussed using three hanging racks 206, 207, and 208, more hanging racks could be added to the distributed asset control system 200 without requiring additional base stations 202. For the exemplary embodiment, a primary tag 210 is mounted on each hanging rack 206, 207, and 208 and controls a set of associated secondary tags 212. Each secondary tag 212 is mounted on an article of clothing. Secondary tags 212 are preferably passive radio tags in order to reduce costs. However, secondary tags 212 may comprise active radio tags.

Each primary tag 210 within the distributed asset control system 200 is loaded with the inventory for the hanging rack to which the primary tag 210 is attached. Periodically, base station 202 transmits updates to the primary tags 210 accounting for garments sold or garments added to the hanging racks. Since a secondary tag 212 is attached to each garment, garments sold or added to hanging racks translates into secondary tag identifications being removed or added to the expected inventory stored in primary tag 210. Each primary tag 210 is programmed to periodically initiate an inventory control function. Thus, the inventory control of each hanging rack 206, 207, and 208 is performed by the primary tag 210 attached to the hanging rack. By distributing the inventory control function into primary tags 210, more available bandwidth and computing power of base station 214 is available for monitoring store exits, sales, new inventory, and other functions.

Each primary tag 210 periodically transmits a non-explicit inventory request message. Each secondary tag 212 within the set of secondary tags 212 associated with each primary tag 210 responds identifying itself as a secondary tag 212 within the operational range 211 of a primary tag 210. Each primary tag 210 receives the responses and generates a monitored asset status by comparing the responding secondary tag 212 identification information to the expected inventory. If there are discrepancies, such as missing or additional garments, an alarm message identifying the missing or extra garments is generated and transmitted to base station 202. Each primary tag 210 is operable to retransmit explicit messages destined for a different device address as previously described. Therefore, an inventory report or alarm message generated by a primary tag 210 may be retransmitted to base station 202 by another primary tag 210. Similarly, when base station 202 transmits messages to primary tags 210, the primary tags 210 are operable to retransmit the message so that all primary tags 210 within distributed asset control system 200 receive the message.

In addition to the periodic inventory control functions of primary tags 210, base station 202 may periodically initiate its own inventory control process, for example when the store opens and closes. Base station 202 would transmit an inventory request message to all primary tags 210 within its operational range 205. Since the inventory request message is a non-explicit communication, primary tags 210 retransmit the message to other primary tags 210 and perform the requested inventory control function. The results of the inventory control functions are transmitted to base station 202 through the primary tag 210 chain utilizing tag to tag communications as previously described.

In another embodiment, the primary tags may be used in connection with a computer, telephone, or other suitable device connected to a base station over a wire line network. In that embodiment, the base station generates a polling event, and the primary tag receives the polling event over the wireline connection and processes the polling event as previously described.

The distributed asset control system utilizing primary tags 210 and secondary tags 212 may be used in various situations. Another example of a situation where this type of system would be appropriate is assisting parents with tracking their children in a crowded environment such as an amusement park. A parent would wear a primary tag 210 and the children would wear secondary tags 212. In this example, the secondary tags 212 are preferably active radio tags in order to eliminate potential environmental influences which may alter the operational range of passive radio tags and, therefore, provide inconsistent results. Using active radio tags provides for a consistent operational range between the primary tag 210 and the secondary tag 212.

In the parent/child system, the primary tag 210 would be set to periodically issue a polling request for its assigned secondary tags 212. The time period is preferably a short time period such as 5-10 seconds. The operational range of the primary tag 210 is set to a relatively short distance such as ten feet. Thus, as long as the secondary tag 212 on each child remains within a ten foot radius of the primary tag 210 on the parent, no error or alarm conditions result. If a child wearing the secondary tag 212 is not within the ten foot radius of the primary tag 210 when the primary tag 210 issues a poll, an alarm would sound on the primary tag 210. The alarm would alert the parent that a child is outside the specified range and investigative action could be started. The secondary tags 212 could also initiate periodic polling to ensure that the primary tag 210 was within range. The system could also include a central monitoring station so that a missing child alarm could be immediately reported to a central facility so that exits could be appropriately monitored.

In another embodiment, the distributed asset control system may be used in a proximity detection application. For example, large hauler trucks or other large equipment that cannot readily see other vehicles in their path may be equipped with a primary tag that periodically polls secondary tags in the other vehicles. Upon receiving a response from a secondary tag that indicates that the secondary tag is within the operational range of the primary tag on the large hauler truck, the primary tag generates an alarm indicating the proximity of other vehicles.

FIG. 10 illustrates the operation of a primary tag 210 in the distributed asset control system 200 in accordance with one embodiment of the present invention. The method begins at step 220 where a primary tag 210 is initialized with the identification numbers of each secondary tag 212 that is functionally associated to primary tag 210. At step 222, the primary tag polls secondary tags 212 to determine or verify the existence of associated secondary tags 212 within the operational range of the primary tag 210. Next, at step 224, secondary tags 212 receiving the poll transmit a response. The responses include the address of the tag generating the response.

Proceeding to step 226, primary tag 210 compares the identifications in the responses from secondary tags 212 to the linked list of secondary tags. The linked list includes the identification of the associated secondary tags. At decisional step 228, the primary tag 210 determines a monitored asset status based on whether the identifications in the responses exist in the linked secondary tag list. If one or more secondary tags on the linked secondary tag lists did not respond or one or more secondary tags responded, the YES branch of decisional step 228 proceeds to step 230 where an alarm condition with the monitored asset status of the most recent polling event is transmitted to the base station 202. If there are no discrepancies between the linked list of secondary tags and the responding secondary tags, the NO branch of decisional step 228 proceeds to step 232 where an all normal message with the results of the most recent polling event is transmitted, when necessary, to the base station 202. The results of the polling event are transmitted only if the RFID system is designed such that base station 202 is informed of each inventory conducted by the primary tags 210.

Figure 11:
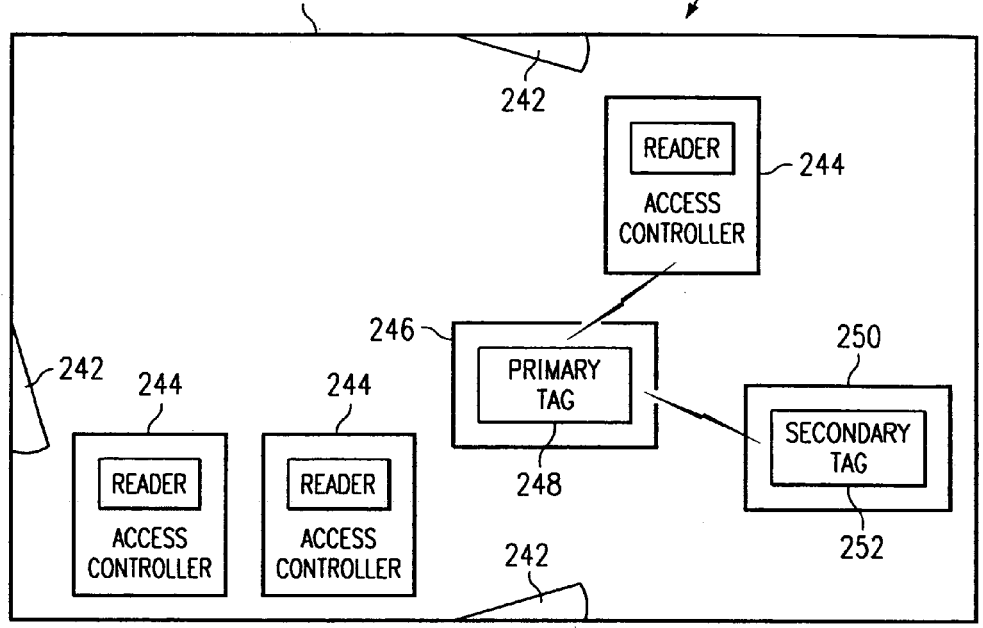
FIG. 11 is a block diagram illustrating a secure facility using a distributed asset control system in accordance with another embodiment of the present invention.

FIG. 11 illustrates an access control system 240 using primary tags and secondary tags. Access control system 240 may be used, for example, in a secure facility 241. The access control system 240 may be used to track high priced assets within secure facility 241 and to prevent unauthorized removal therefrom.

Secure facility 241 may have several access doors 242. Each access door 242 has an access controller 244 which may be networked to a central control computer (not expressly shown). A primary tag 248 is attached to an asset 246 such as a laptop computer or a personal computer. Primary tag 248 is preferably a dual frequency radio tag such as dual frequency radio tag 29 previously described. Primary tag 248 has been previously loaded with the identification numbers of linked secondary tags 252 which may possess and remove asset 246 from secure facility 241. A person 250 has a secondary tag 252. Active or passive secondary tag 252 may be an identification tag. In one embodiment, only persons 250 with a secondary tag 252 that is linked to primary tag 248 on asset 246 are permitted to remove asset 246 from secure facility 241.

In another embodiment, access control system 240 may be used to prevent assets 246 from leaving secure facility 241. In that embodiment, primary tag 248 would have no authorized secondary tags 252 loaded in its memory. One skilled in the art will understand that the access control system 240 can provide many levels of control. For instance, two separate assets which must be used together could be linked so that one asset could not be moved without the other. Another example would be mandating that certain persons always leave the secure facility with a certain asset such as a pager.

In another embodiment, access control system 240 may be used as a warranty control and fraud detection system. In this embodiment, products with expensive parts may be monitored to determine if the original parts are present when the product is submitted for warranty repair. For example, a computer has several expensive component parts that may be interchanged thus subjecting the warranty repair facility to fraudulent requests for repairs when non-functioning, non-original parts are placed in the computer. In the exemplary embodiment, a computer has a primary tag mounted inside the computer case. A secondary tag is mounted on each component part of interest. For instance, the mother board, the processor chip, the power supply, the disk drive, the CD-ROM drive, and any other expensive parts may have a secondary tag. Before leaving the manufacturing facility, the primary tag is loaded with a functionally linked list of secondary tags.

When the computer is submitted for warranty work, a base station issues a wakeup signal causing the primary tag to poll the surrounding secondary tags to determine if all the original parts are present. If each secondary tag on the linked list of secondary tags is present, the primary tag issues an equipment list verification message to the base station. If any original parts are missing, the primary tag would issue a missing parts message to the base station. If any parts are changed during warranty repair, the primary tag is updated with the new list of functionally linked secondary tags.

Figure 12:
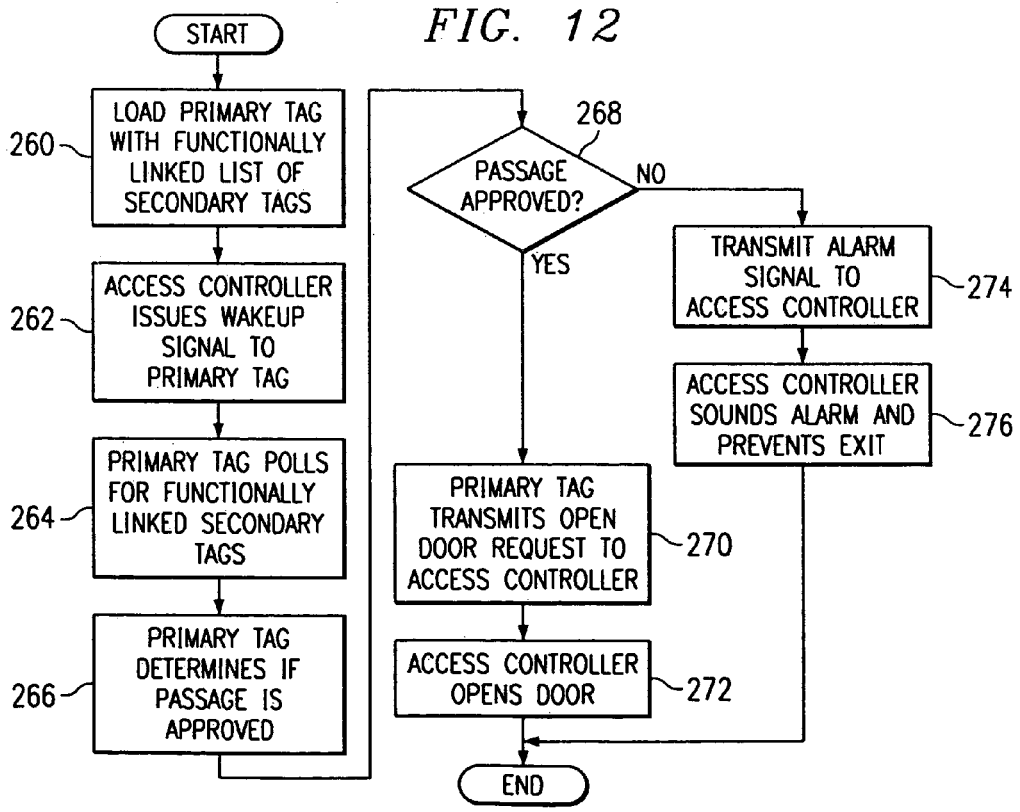
FIG. 12 is a flow diagram illustrating operation of the distributed asset control system in the secure facility of FIG. 11 in accordance with one embodiment of the present invention.

FIG. 12 illustrates the basic method of the access control system 240 of the present invention. The method begins at step 260 where primary tag 248 is loaded with a list of linked secondary tags 252. The linkage identifies which secondary tags 252 can or must accompany primary tag 248 as it proceeds through an access door 242. Access door 242 may be an exit from secure facility 241 or an access between secured locations within secure facility 241.

During operation, at step 262, an access controller 244 issues a wakeup signal. As person 250 approaches access door 242 with asset 246, primary tag 248 receives the wakeup and/or other suitable signal and message indicative of an attempt being made to remove the asset of the tag from the secure facility 241. The method then proceeds to step 264 where primary tag 248 issues a polling request for tags within its operational range. At step 266, primary tag 248 receives, accumulates and processes the responses from tags within the operational range of primary tag 248.

In processing responses, the primary tag determines if passage through access door 242 is permitted. If a responding secondary tag is on the list of linked secondary tags, exit may be approved. If the accumulated responses do not include a functionally linked secondary tag 252, exit through access door 242 may be denied. Next, primary tag 248 approves passage through access door 242, the YES branch of decisional step 268 proceeds to step 270 where primary tag 248 transmits an open door request or other suitable signal indicating that passage should be allowed to access controller 244. At step 272, access controller 244 receives the open door request and opens access door 242. If primary tag 248 does not approve passage through access door 242, the NO branch of decisional step 268 proceeds to step 274 where primary tag 248 generates and transmits an alarm signal to access controller 244. At step 276, access controller 244 sounds an alarm indicating that an unauthorized person is attempting to remove an asset from secure facility 241 and prevents exit from secure facility 241.

FIG. 13 illustrates an asset management system 280 utilizing a hierarchy of primary tags and secondary tags to ensure that equipment, goods, personal, and other items are properly matched. An example of an asset management system 280 in accordance with the present invention is a secure trucking facility 281 having access gates 282. A gate control system 283 controls access gates 282 providing entrance to and exit from the secure trucking facility 281. Secure trucking facility 281 includes a warehouse and loading dock (not expressly shown).

Referring to FIG. 13, a tractor 296 has a tractor tag 286. Tractor tag 286 is a secondary tag and may be an active secondary tag or passive secondary tag as previously discussed. Trailer 292 has a trailer tag 288. Trailer tag 288 is an intermediate tag that functions as both a primary tag and a secondary tag. Trailer tag 288 is similar to radio tag 29 as previously discussed. Trailer 288 contains a set of cargo 292 wherein each cargo box 294 has a cargo tag 295. Cargo tag 295 may be a secondary tag as previously discussed. A driver (not expressly shown) has a driver tag 284. Driver tag 284 may be a primary tag such as radio tag 29 as previously discussed.

Asset management system 280 utilizes a hierarchy of primary tags to distribute the asset management functions of the system. The first level of primary tag would be the driver tag 284 that communicates directly with gate control system 283. Driver tag 284 then controls the second level of primary tag, the intermediate trailer tag 288. Trailer tag 288 manages its linked secondary tags, cargo tags 295. Driver tag 284 manages its functionally linked secondary tags, tractor tag 286 and trailer tag 288.

A driver is assigned a driver tag 284 that has a list of linked secondary tags that must be present before driver tag 284 informs gate control system 283 to open access gates 282. In the exemplary embodiment, driver tag 284 has the identification number of tractor tag 286 and trailer tag 288 on its functionally linked secondary tag list. Trailer tag 288 is loaded with a list of linked cargo tags 295 that should be present on the trailer 292.

The trailer 292 is loaded with cargo 294 at a loading dock. The driver couples his assigned tractor 296 to the appropriate trailer 292 and proceeds to access gates 282. As the tractor trailer rig approaches gate control system 283, gate control system 283 transmits a wakeup signal. Driver tag 284 receives the wakeup signal and transmits a polling request for linked secondary tags within its operational range. Tractor tag 286 and trailer tag 288 receive the polling request and issue a response identifying themselves. Driver tag 284 verifies that tractor tag 286 and trailer tag 288 identify the expected tractor and trailer combination loaded in driver tag 284. After trailer tag 288 receives the polling request from driver tag 284, trailer tag 288 also acts as a primary tag and issues a polling request to the set of cargo tags 295. Each cargo tag 295 issues a response identifying itself to trailer tag 288. Trailer tag 288 accumulates the responses from cargo tags 295 and compares identifications in the responses to its list of linked secondary tags. If trailer tag 288 determines that a linked secondary tag is missing or that a responding cargo tag 295 is not on the linked secondary tag list, trailer tag 288 transmits a message to driver tag 284 indicating that the cargo 290 loaded on trailer 292 is incorrect. If trailer tag 288 determines that the appropriate cargo 290 has been loaded on trailer 292 based on matching the responding cargo tags 295 with the linked list of secondary tags, trailer tag 288 transmits a message to driver tag 284 indicating that the appropriate cargo 290 has been loaded on trailer 292.

Driver tag 284 determines if the proper tractor 296 and trailer 292 combination exists and whether trailer tag 288 has determined if trailer 292 has been loaded with the correct cargo 290. Based on this information, driver tag 284 transmits a message to gate control system 283 either authorizing exit from secure trucking facility 281 or indicating that an error condition exists and must be investigated. By utilizing the system, a secure trucking facility 281 may ensure that the correct cargo 290 is being transported to the correct location before the tractor-trailer rig leaves the secure trucking facility 281. Gate control system 283 can be likewise configured to perform some or all of driver, tractor, trailer and cargo inquiries. However, by distributing certain processing into the radio tags, bandwidth savings are realized and gate control system 282 has increased processing capabilities.

It is apparent that there has been provided in accordance with the present invention a system for communications between radio tags which satisfies the advantages set forth above such as providing communications between radio tags and distributed processing capability for the RFID system. Although the present invention and its advantages have been described in detail, it should be understood that various changes, substitutions, and alterations readily apparent to those skilled in the art may be made without departing from the spirit and the scope of the present invention as defined by the following claims.

What is claimed is:

1. A radio frequency tag, comprising:
   an antenna system;
   a first radio frequency receiver coupled to the antenna system and operable to receive and process request signals from a base station at a first frequency;
   a second radio frequency receiver coupled to the antenna system and operable to receive and process request signals from one or more other radio frequency tags at a disparate second frequency; and
   a transmitter coupled to the antenna system and operable to transmit response signals at the second frequency.

2. The radio tag of claim 1, wherein the radio frequency tags have a limited power supply and the first frequency is a lower frequency than the second disparate frequency.

3. The radio tag of claim 2, wherein the first frequency is a low frequency (LF).

4. The radio tag of claim 2, wherein the first frequency is a very low frequency (VLF).

5. The radio tag of claim 2, wherein the first frequency is a microwave frequency.

6. The radio tag of claim 2, wherein the second frequency is a very high frequency (VHF).

7. The radio tag of claim 2, wherein the second frequency is an ultra high frequency (UHF).

8. The radio tag of claim 2, wherein the second receiver comprises:
   a local oscillator operable, when active, to generate a demodulated signal by demodulating received traffic;
   a detector coupled to the local oscillator to detect communicated signals in the demodulated signal; and
   a quench oscillator coupled to the local oscillator and operable to periodically activate the local oscillator for the purpose of detecting the presence of a communicated signal and to continuously activate the local oscillator in response to the presence of the communicated signal for the purpose of collecting the communicated signal.

9. The radio tag of claim 8, wherein the local oscillator is operable to demodulate received traffic at the first frequency and the communicated signal is traffic modulated at the first frequency.

10. The radio tag of claim 8, the quench oscillator comprising:
    a first stage quench oscillator coupled to the local oscillator and operable, when active, to activate the local oscillator; and
    a second stage quench oscillator coupled to the first stage quench oscillator and operable in a low power mode to periodically activate the first stage quench oscillator in order to periodically activate the local oscillator for the purpose of detecting the presence of the communicated signal and operable in a full power mode to continuously activate the first stage quench oscillator in order to continuously activate the local oscillator for the purpose of collecting the communicated signal.

11. The radio tag of claim 10, further comprising a microcontroller coupled to the detector and the quench oscillator and operable to control the mode of the second stage quench oscillator in response to detection of the communicated signal by the detector.

12. The radio tag of claim 11, wherein the microcontroller is operable to automatically transition the second stage quench oscillator from the low to the full power mode in response to detection of the communicated signal by the detector and to automatically return the second stage quench oscillator from the full to the low power mode following collection of the communicated signal.

13. The radio tag of claim 10, wherein the low power mode has a limited duty cycle.

14. The radio tag of claim 10, wherein the low power mode has a duty cycle of five percent or less.

15. The radio tag of claim 10, wherein the low power mode has a duty cycle of approximately one percent or less.

16. The radio tag of claim 8, wherein the quench oscillator is a dual frequency oscillator having a low power mode to periodically activate the local oscillator for the purpose of detecting the presence of the communicated signal and a full power mode to continuously activate the local oscillator for the purpose of collecting the communicated signal.

17. The radio tag of claim 8, further comprising:
    a battery power supply;
    a low power mode for the quench oscillator to periodically activate the local oscillator for the purpose of detecting the presence of the communicated signal; and
    wherein the low power mode is powered by only leakage current from the battery.

18. The radio tag of claim 17, wherein the leakage current is less than 500 nanoamps.

19. The radio tag of claim 2, wherein the first receiver comprises:
    a threshold voltage generator coupled to a local power supply and operable to generate a threshold voltage signal on a threshold voltage generator output; and
    a comparator having a first comparator input coupled to the antenna system to accept a received signal and a second comparator input coupled to the threshold voltage generator output to receive the threshold voltage signal, the comparator powered by the local power supply and operable to compare the received signal to the threshold voltage signal and to generate a digital output based on the comparison.

20. The radio tag of claim 19, wherein the comparator and the threshold voltage generator are powered by only leakage current from the local power supply.

21. The radio tag of claim 19, wherein the comparator and the threshold voltage generator are powered by less than four microamps of current from the local power supply.

22. The radio tag of claim 19, wherein a power consumption of the comparator is approximately three microamps or less.

23. The radio tag of claim 19, wherein a power consumption of the threshold voltage generator is less than 1 microamp of current from the local power supply.

24. The radio tag of claim 19, wherein the local power supply is a battery power supply.

25. The radio tag of claim 19, wherein the comparator has a propagation delay of less than fifteen percent of a period of a carrier signal of the second frequency on which communicated signals are received such that at least seven digital outputs are generated for each period.

26. The radio tag of claim 19, wherein the comparator has a propagation delay of approximately ten percent of a period of a carrier signal of the second frequency on which communicated signals are received such that at least ten digital outputs are generated for the received signal during each period.

27. The radio tag of claim 19, wherein the comparator has a propagation delay of less than one microsecond.

28. The radio tag of claim 19, the threshold voltage generator comprising:
   a first resistor coupled to the local power supply;
   a second resistor coupled in series to the first resistor, the second resistor further coupled to a ground; and
   the threshold voltage generator output coupled to a connection between the first resistor and the second resistor.

29. The radio tag of claim 28, further comprising:
   a capacitor coupled to the connection between the first resistor and the second resistor, the capacitor further coupled to the ground, the capacitor operable to maintain a substantially constant voltage on the threshold voltage generator output.

30. The radio tag of claim 19, wherein the threshold voltage signal is less than 50 millivolts.

31. The radio tag of claim 19, wherein the threshold voltage signal is less than 500 millivolts.

32. The radio tag of claim 1, further comprising:
   a processor coupled to the first receiver, the second receiver, and the transmitter, the processor operable to generate response signals for transmission in response to the request signals received by the first receiver and the second receiver.

33. The radio tag of claim 1, further comprising a local power supply.

34. A radio tag, comprising:
   an antenna system;
   a first receiver coupled to the antenna system and operable to receive and process signals from a first unit type at a first frequency, the first receiver comprising:
      a local oscillator operable, when active, to generate a demodulated signal by demodulating received traffic;
      a detector coupled to the local oscillator to detect communicated signals in the demodulated signal; and
      a quench oscillator coupled to the local oscillator and operable to periodically activate the local oscillator for the purpose of detecting the presence of a communicated signal and to continuously activate the local oscillator in response to the presence of the communicated signal for the purpose of collecting the communicated signal;
   a second receiver coupled to the antenna system and operable to receive and process request signals from a second unit type at a disparate second frequency, the second receiver comprising:
      a threshold voltage generator coupled to a local power supply and operable to generate a threshold voltage signal on a threshold voltage generator output; and
      a comparator having a first comparator input coupled to an antenna to accept a received signal and a second comparator input coupled to the threshold voltage generator output to receive the threshold voltage signal, the comparator powered by the local power supply and operable to compare the received signal to the threshold voltage signal and to generate a digital output based on the comparison;
   a transmitter coupled to the antenna system and operable to transmit response signals at the second frequency.

35. The radio tag of claim 34, wherein the second unit type has a limited power supply and the first frequency is a lower frequency than the second disparate frequency.

* * * * *